US011474956B2

(12) United States Patent
Grocutt

(10) Patent No.: US 11,474,956 B2
(45) Date of Patent: Oct. 18, 2022

(54) MEMORY PROTECTION UNIT USING MEMORY PROTECTION TABLE STORED IN MEMORY SYSTEM

(71) Applicant: Arm Limited, Cambridge (GB)

(72) Inventor: Thomas Christopher Grocutt, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 17/260,026

(22) PCT Filed: Jun. 6, 2019

(86) PCT No.: PCT/GB2019/051565
§ 371 (c)(1),
(2) Date: Jan. 13, 2021

(87) PCT Pub. No.: WO2020/021223
PCT Pub. Date: Jan. 30, 2020

(65) Prior Publication Data
US 2021/0311884 A1 Oct. 7, 2021

(30) Foreign Application Priority Data
Jul. 27, 2018 (GB) ...................................... 1812313

(51) Int. Cl.
*G06F 12/14* (2006.01)
*G06F 3/06* (2006.01)
(52) U.S. Cl.
CPC ........ *G06F 12/1416* (2013.01); *G06F 3/0622* (2013.01); *G06F 3/0638* (2013.01); *G06F 3/0673* (2013.01); *G06F 2212/1052* (2013.01)

(58) Field of Classification Search
CPC .. G06F 12/1416; G06F 3/0622; G06F 3/0638; G06F 3/0673; G06F 2212/1052;
(Continued)

(56) References Cited

U.S. PATENT DOCUMENTS 7,287,140 B1 * 10/2007 Asanovic ............ G06F 12/1483
711/208
2003/0149851 A1 8/2003 Shiota et al.
(Continued)

FOREIGN PATENT DOCUMENTS

WO 2014/122414 8/2014

OTHER PUBLICATIONS

International Search Report for PCT/GB2019/051565 dated Oct. 23, 2019, 6 pages.
(Continued)

*Primary Examiner* — Zhuo H Li
(74) *Attorney, Agent, or Firm* — Nixon & Vanderhye P.C.

(57) ABSTRACT

An apparatus comprises processing circuitry to issue memory access requests specifying a target address identifying a location to be accessed in a memory system; and a memory protection unit (MRU) comprising permission checking circuitry to check whether a memory access request issued by the processing circuitry satisfies access permissions specified in a memory protection table stored in the memory system. The memory protection table comprises memory protection entries each specifying access permissions for a corresponding address region of variable size within an address space, where the variable size can be a number of bytes other than a power of 2.

24 Claims, 12 Drawing Sheets

(58) Field of Classification Search
CPC ............ G06F 12/1441; G06F 12/1009; G06F 12/1027; G06F 12/1475; G06F 2212/1024; G06F 12/1483
See application file for complete search history.

(56) References Cited

U.S. PATENT DOCUMENTS

| | | |
|---|---|---|
| 2009/0276595 A1 | 11/2009 | Abzarian et al. |
| 2016/0048353 A1 | 2/2016 | Nakashima |
| 2018/0129620 A1* | 5/2018 | Gittins ................ G06F 12/1045 |
| 2018/0165218 A1* | 6/2018 | Parker ................ G06F 12/1009 |

OTHER PUBLICATIONS

Written Opinion of the ISA for PCT/GB2019/051565 dated Oct. 23, 2019, 10 pages.
ARM, "ARMv8-A Address Translation", Feb. 28, 2017, XP055508516, 32 pages.
Combined Search and Examination Report for GB1812313.3 dated Feb. 5, 2019, 7 pages.
Examination Report for GB1812313.3 dated Nov. 18, 2020, 4 pages.

* cited by examiner

MEMORY PROTECTION UNIT USING MEMORY PROTECTION TABLE STORED IN MEMORY SYSTEM

CROSS-REFERENCE TO RELATED APPLICATIONS

This application is the U.S. national phase of International Application No. PCT/GB2019/051565 filed Jun. 6, 2019 which designated the U.S. and claims priority to GB 1812313.3 filed Jul. 27, 2018, the entire contents of each of which are hereby incorporated by reference.

The present technique relates to the field of data processing. More particularly it relates to an apparatus having a memory protection unit (MPU).

A data processing apparatus may have processing circuitry for performing data processing operations. The processing circuitry may issue memory access requests specifying a target address identifying a location to be accessed in a memory system. It may be desirable to define access permissions which control whether certain software processes are allowed to access certain regions of an address space. For example, the access permissions could specify whether a certain address region is read-only, or can be both readable and writeable, or could specify which privilege levels are allowed to access the corresponding address region. It may also be desirable to control whether an area of memory is executable. Such execute permissions may be conditional on privilege level, for example it may be desirable to permit unprivileged execution of an area of memory but prohibit execution in a privileged mode. When an access is granted it may also be desirable to perform the access according to attributes associated with a certain address region, for example whether caching, buffering, or combining accesses for the address region is permitted.

At least some examples provide an apparatus comprising:
processing circuitry to issue memory access requests specifying a target address identifying a location to be accessed in a memory system; and
a memory protection unit (MPU) comprising:
permission checking circuitry to check whether a memory access request issued by the processing circuitry satisfies access permissions specified in a memory protection table stored in the memory system, the memory protection table comprising a plurality of memory protection entries, each memory protection entry specifying: access permissions for a corresponding address region of variable size within an address space, and region identifying parameters for identifying a start address and an end address of the corresponding address region, wherein said MPU is configured to permit said variable size to be a number of bytes other than a power of 2; and
MPU memory access circuitry to initiate at least one MPU memory access request for accessing the memory protection table from said memory system.

At least some examples provide a method comprising:
issuing a memory access request specifying a target address identifying a location to be accessed in a memory system; and
checking whether the memory access request satisfies access permissions specified in a memory protection table comprising a plurality of memory protection entries, each memory protection entry specifying: access permissions for a corresponding address region of variable size within an address space, and region identifying parameters for identifying a start address and an end address of the corresponding address region, wherein said variable size is permitted to be a number of bytes other than a power of 2; in which:
the memory protection table is stored in said memory system.

At least some examples provide a computer program for controlling a host data processing apparatus to provide an instruction execution environment for execution of instructions; the computer program comprising:
processing program logic to issue memory access requests specifying a target address identifying a location to be accessed within a simulated address space simulated by said instruction execution environment; and
memory protection unit (MPU) program logic, comprising:
permission checking program logic to check whether a memory access request issued by the processing program logic satisfies access permissions specified in a memory protection table comprising a plurality of memory protection entries, each memory protection entry specifying: access permissions for a corresponding address region of variable size within said simulated address space, and region identifying parameters for identifying a start address and an end address of the corresponding address region, wherein said MPU program logic is configured to permit said variable size to be a number of bytes other than a power of 2; and
MPU memory access program logic to initiate at least one MPU memory access request specifying an address from said simulated address space, for accessing the memory protection table.

Further aspects, features and advantages of the present technique will be apparent from the following description of examples, which is to be read in conjunction with the accompanying drawings, in which:

FIG. 1 schematically illustrates an example of a data processing apparatus having an MPU;

CONTROL OF ACCESS TO MEMORY

Figure 1:
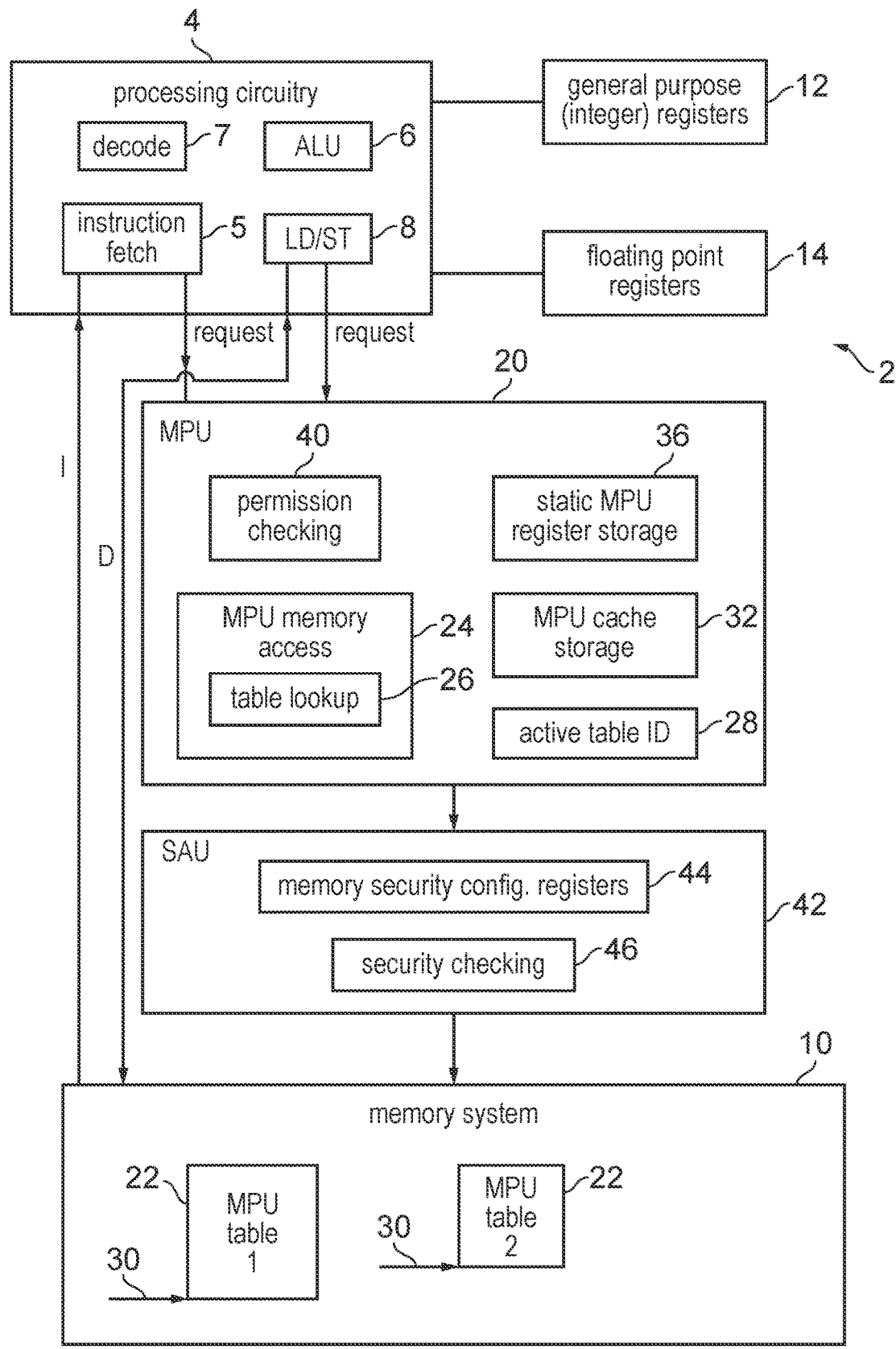

One approach for controlling access to a memory system may be to provide a memory management unit (MMU) which checks whether memory access requests satisfy access permissions specified in page tables stored in the memory system. The address space is typically divided into regions called pages which each have a size corresponding to a power of two number of bytes (e.g. 4 kilobytes), where the start and end addresses of each page are aligned to a N byte address boundary, where N is the size of the corresponding address region. Each page table entry specifies the access permissions for a corresponding page of the address space, and often will also specify an address translation mapping for mapping a target address in a first address space (e.g. a virtual address space) to a corresponding page of addresses in a second address space (e.g. a physical address space). The page table may be implemented as a hierarchical table structure including a number of levels of page tables, where a first subset of bits of an input address indexes into a corresponding entry of a first level page table, and the indexed entry specifies the base address of a second level page table from which an entry can be indexed based on a second subset of bits of the input address, and so on for each subsequent level of the table until eventually a final level of page table is reached where the indexed entry is selected based on some bits of the address specifies. The indexed entry contains the actual address translation attributes and access permissions required for the memory accesses targeting that page. The MMU may have a cache (called a translation lookaside buffer (TLB)) which can cache certain entries of the page tables which have more recently been accessed from the memory system, so that they can be accessed again more quickly if the processing circuitry issues multiple memory access requests requiring the same page table entry. An MMU can be useful for processors designed to handle relatively high performance workloads, for which it may be acceptable to set controls over access to many different address regions, e.g. such control may be at a 4 Kbyte granularity, and for which arbitrary mappings of address translations from any page in the first address space to any arbitrary page in the second address space may be required in order to handle accesses triggered by a number of different software processes which use the same virtual address but need to be mapped to different physical addresses used by the memory system.

However, for processors aimed at more energy-efficient workloads or designed for real time applications, an MMU may be unsuitable as the large page table structures used to define the access permissions to individual pages, and the granularity of control, may be too large for the constrained memory environment typically seen in systems aimed at more energy-efficient lower performance, applications, which can have as little as two kilobytes of random access memory (RAM). Also, to facilitate using a subset of the input address bits as an index into the page tables, an MMU typically constrains each page to have a size corresponding to a power of two number of bytes. This means that if it is desired to set a certain set of access permissions only for a certain address region which has a size other than a power of two number of bytes, this would have to be represented using a number of separate page table entries each corresponding to a smaller page of a power of two number of bytes in size, with each of those individual page table entries defining exactly the same access permissions so that the set of page table entries as a whole corresponds to the larger non-power of two sized address region. This artificial partition of an address region into multiple pages is a consequence of the restriction of the page alignment to address boundaries corresponding to the size of the page, which is required in order to enable an efficient indexing procedure using a whole number of bits from the input address for indexing into the hierarchical page structures used to cover a large address space.

However, this approach may cause problems for real time code because it means that within a piece of code or data intended to be governed by a given set of access permissions, the memory accesses may cross a page boundary between pages corresponding to different page table entries of the page tables, and so if the page table entry for the new page is not already cached in the MMU then this may require a page table walk to be performed to fetch the required page table entry from memory, partway through execution of a section of code. Also, if on reaching the page boundary, it is found that the page table entry for the next page has not yet been defined in the page tables, this may cause a fault which may be slow to deal with as it may require a software exception handler to trigger an operating system or other supervising process to set the page table entry to map the required page, causing a long delay. Such delays can be highly variable and in the worst case may be extremely long, and if the section of code issues memory accesses to addresses spanning more than two different pages then at each page boundary such delays can be incurred again. This makes it very difficult for an MMU to be able to satisfy the requirement in real time applications to have deterministic response times.

Another approach for controlling access to memory can be to provide a memory protection unit (MPU), which checks whether memory access requests issued by the processing circuitry satisfy access permissions specified in a number of memory protection entries. Each memory protection boundary may correspond to a particular address region of variable size within the address space. The corresponding address region for a given memory protection entry can be bounded by start and end addresses which are identified through parameters of the given memory protection entry. Unlike for the page tables used by an MMU, for an MPU the region corresponding to a memory protection entry may have a variable size which may be permitted to be a number of bytes other than a power of two. With this approach, it can be guaranteed that a memory address region of an arbitrary (non power of 2) size can be defined using a single memory protection entry, to avoid the risk of page walks and page faults occurring each time address accesses cross a page address boundary. This makes an MPU more suitable for systems designed for processing real time applications. Also, the MPU typically stores each of the memory protection entries within registers provided locally within the MPU, which can be fast to access, again assisting with real time processing and avoiding the need for storing large page tables having a hierarchical structure within the memory system, which can be important for systems with limited RAM.

However, in systems comprising an MPU, a disadvantage is that because the configuration data for controlling access to memory is specified using registers which are typically directly connected to a parallel bank of comparators for comparing the target address to be accessed with the region identifying parameters of each memory protection entry stored in the registers, the power and area associated with an MPU scales badly as the number of memory protection entries supported by the MPU increases. In practice, this may mean that the number of memory protection entries supported may be limited to a relatively small number, e.g. 8 or 16. The limited number of memory protection entries in a typical MPU may cause a severe impact on the performance achieved by software executing on the processing system.

For example, a piece of software may require a greater number of distinct address regions to be defined with different access permissions than is supported in hardware in the number of protection entries supported by the MPU. In this case, at any given time at least some parts of the address space required to be accessed by that software will not currently have a corresponding memory protection entry defined for it. This would mean that an access to an address in a currently undefined region of the address space would trigger an exception which would then require software to step in and reconfigure the registers of the MPU, so as to overwrite the parameters previously defined for a different region with the parameters required for the region needed to be accessed now. If a later instruction then accesses the previously defined region which has been overwritten, this may then cause the MPU configuration to be switched back again. This constant switching of the contents of the MPU registers, needing an exception to trigger the switching each time, may greatly harm performance.

Another example can be where the processor needs to execute multiple pieces of software which are mutually distrustful, but which need to share data between them. To enable the sharing of data a given piece of software may wish to divide up portions of the address space so that only limited portions of the address space are accessible to other processes, but to provide such fine degree of control over access to the address space, this may require additional address regions to be defined, and there may not be enough spare memory protection entries supported by the MPU in hardware to allow such fine grained control. Hence, in practice the same data may end up being copied into multiple parts of the address space, one copy in the part accessed by the first software and another in the part accessed by the second software, which results in time being wasted to perform the copying and inefficient use of the memory capacity available, which can be a particular problem in systems with constrained memory resources.

Hence, typical MMUs and MPUs may not currently provide an efficient solution for controlling access to the memory system based on per-region defined access permissions in a system with a real time requirement and/or relatively constrained memory capacity.

MPU With Memory-Based Memory Protection Table

In the technique discussed below, an MPU is provided comprising permission checking circuitry to check whether a memory access request issued by processing circuitry satisfies access permissions specified in a memory protection table stored in the memory system. The memory protection table includes a number of memory protection entries which each specify access permissions for a corresponding address region of variable size within an address space. Each entry also specifies region identifying parameters for identifying a start address and an end address of the corresponding address region. The MPU permits the variable size to be a number of bytes other than a power of 2. MPU memory access circuitry is provided to initiate at least one memory access request for accessing the memory protection table from the memory system.

Hence, by providing the memory protection table in the same memory system for which access is policed by the MPU, this provides the flexibility to provide a greater number of memory protection entries then is practical for a typical MPU based on registers storing region defining data for each entry which is compared in parallel to a target address. It may be counterintuitive that moving the memory protection table into the memory system (which is typically slower to access than registers) would provide improved software performance. However, although accessing an individual memory protection entry from the memory system may be slower, the overall performance may be improved by avoiding the software workarounds discussed above for dealing with cases where the number of entries supported by the MPU in hardware is insufficient to deal with the requirements of the software, which would otherwise incur a great performance cost by encountering frequent exceptions due to accesses to undefined regions of the address space. With a memory protection table provided in memory, the hardware costs scale much less steeply with the number of entries.

Also, by permitting each region to have an arbitrary size corresponding to a number of bytes other than a power of 2, this means that each region can cover a large amount of memory and it is not necessary to subdivide regions intended to have the same access permissions into multiple separate entries, which would otherwise be at risk of causing memory protection faults when addresses cross a region boundary. This makes the MPU better than an MMU at servicing real time applications which require critical operations to be handled with a fast and/or deterministic response time.

The entries of the memory protection table may be arranged in the address space in order of the start address of the corresponding address region for each entry. This may differ to the page table structure used by an MMU, for which each level of the page table may include entries with pointers to further level page tables and so within the overall page table structure the final level page table entries which actually provide the access permissions for respective pages may be arranged in an order within the address space which differs from the order of the start addresses with each corresponding address page. By implementing the memory protection entries of the memory protection table as a linearly accessed table arranged in order of the start address, this can make searching the memory protection table for the relevant memory protection entry for a given target address simpler.

Each memory protection entry corresponds to a given address region of the address space. In some implementations the address space may be a physical address space. Hence, the memory protection table may be queried based on physical addresses specified by the memory access request issued by the processing circuitry, where the physical addresses directly correspond to corresponding locations accessed in the memory system. This may be suitable for real time applications as by avoiding address translation this can make access to memory faster as it may be possible to perform access to memory in parallel with the access to memory protection table. If it is subsequently determined that the permissions are not satisfied then data returned by the access to memory would not be forwarded to the processing circuitry.

When the MPU memory access circuitry initiates at least one MPU memory access request for accessing the memory protection table from the memory system, this may require access to multiple memory protection entries of the memory protection table, not only the memory protection entry which corresponds to the address region including the target address. This is because when each entry may correspond to a variable size region of a non-power of two number of bytes, the addresses in the memory system at which the entry associated with a given address region is located may not be known in advance and so in practice the table may need to be searched in order to find the entry for the region comprising a target address, which may require accesses to more than one entry in order to compare the target address with the region identifying parameters of that entry. Hence, if the target address lies within the corresponding address region of a given memory protection entry of the table, at least one MPU memory access request may be issued and at least one of the issued MPU memory access request(s) may target the given memory protection entry (and often there may also be MPU memory access requests to other memory protection entries).

For each memory protection entry, the MPU may permit the start address and the end address of the corresponding address region to unaligned to an N byte address boundary where N bytes is the size of the corresponding address region. This enables the MPU to manage access permissions for a single address region of any arbitrary size starting at unaligned addresses, which can help avoid the artificial partitioning of a region with shared properties into multiple entries which would otherwise be required in systems which constrain regions to start at aligned address boundaries, which can help improve performance for real time code for the reasons discussed above.

The MPU may have static MPU register storage for storing at least one static memory protection entry. The at least one static memory protection entry may provide further definitions of address regions with specified access permissions, to supplement the permissions defined in the memory protection entries of the memory protection table which is stored in the memory system. Providing some configuration options to provide additional MPU regions defined in static register storage can be useful to keep interrupt latencies low and provide deterministic interrupt behaviour. For example the static MPU register storage could define access permissions for certain critical address regions to be accessed by performance-critical code, so as to provide a faster response than if they had to be checked by memory protection entries loaded from the memory system. Hence, in an implementation having static MPU register storage, the MPU may effectively be a hybrid MPU which uses both register based entries defining some address regions and memory based entries defining other address regions. This can provide a good balance between the interrupt latencies and real time guarantees required for certain systems, the hardware cost of implementing the MPU and the software performance achieved by software which may require a larger total number of memory protection entries to be defined at a given time.

The static MPU register storage may be static in the sense that, once configured by at least one MPU parameter configuration operation processed by the processing circuitry, in the absence of a system reset or power down event, the static memory protection entry stored in the static MPU register storage remains stored in the static MPU register storage until a further MPU parameter configuration operation is processed by the processing circuitry to trigger a reconfiguration of the static memory protection entry. The MPU parameter configuration operation may be any operation which changes the attributes specified for a given address region (e.g. changing the access permissions or changing the limit addresses for the region), so that there will be a change in how memory accesses are handled for a part of the address space. The MPU parameter configuration operation could be a dedicated MPU configuration instruction executed by the processing circuitry, or could be a store instruction which specifies as its target address an address mapped to the static MPU register storage of the MPU. The MPU parameter configuration operation may also be an operation performed by the processing circuitry as requested by a debugger or other entity external to the processing circuitry. Hence, when a static memory protection entry is active in the static MPU register storage, this differs from a cache in that the static memory protection entry will remain until it is reconfigured, regardless of which addresses are accessed by the system. In contrast, a cache would have its entry evicted if it is not used for a time or based on some other eviction policy, to make way for an entry for a different address which may be needed, without requiring any MPU configuration operation to be performed by the processing circuitry. With a cache while the particular entry that is cached may change from time to time, this would not mean that there is any change in the underlying attributes specified by a given memory protection entry of the memory protection table, as the change in cache occupancy merely affects the latency with which a given memory protection entry can be obtained, rather than changing the functional definition of how memory accesses to a given address are to be handled.

In response to the memory access request issued by the processing circuitry, the MPU memory access circuitry may suppress the at least one MPU memory access request from being issued to the memory system when the target address is within the corresponding address region for a static memory protection entry stored in the static MPU register storage and the memory access request issued satisfies the access permissions specified by that static memory protection entry. Hence, when there is a hit in a static memory protection entry, there is no need to trigger any MPU memory access request for fetching a memory protection entry of the memory protection table. This helps to preserve memory bandwidth which could be used for other operations, and means that performance critical software that uses the static entry stored in the static MPU register storage will not be stalled due to memory-based region lookups. Effectively, the static memory protection entries may take priority over the memory-based entries of the memory protection table.

The case when the target address of the memory access request hits in the static memory protection entry, but the access request fails to satisfy the access permissions specified by that static memory protection entry, can be handled in different ways. In some cases the at least one MPU memory access request may also be suppressed when the memory access request fails to satisfy the access permissions specified in the static memory protection entry for which the target address was in the corresponding address region. Hence, in this case if there is any hit in the static MPU register storage then there is no need to access the memory protection table in the memory system.

Alternatively, for memory access requests which hit in the static memory protection entry but fail the access permissions in that static memory protection entry, the access permissions may be permitted to be overridden by access permissions specified by a matching memory protection entry within the memory protection table stored in the memory system (the matching memory protection entry comprising an entry for which the corresponding address region includes the target address). Hence, a hit in the static MPU register storage when the request is allowed overrides any permissions set in the memory-based memory protection entries, but a hit in the static MPU register storage when the request is not allowed by the static entry can be overridden by other access permissions specified in a matching memory protection entry of the memory protection table. This approach can be useful to reduce the total number of regions which need to be defined to allow a first software process access to a specific sub-region of an address region accessed by a second software process. For example, the static MPU entry could be set for the wider address region to permit the second software process to access that region but deny the first software process access. A memory-based memory protection entry covering a smaller address region within the wider region could then be specified only for the subrange which is allowed to be accessed by the first software. This can avoid the need for providing separate entries for the parts of the wider range either side of the subrange accessed by the first software, preserving other static memory protection entries for other purposes or enabling a reduction in the total size of the memory protection table.

Each static memory protection entry may be associated with an unused indication indicative of whether the static memory protection entry is an unused static memory protection entry. When a given static memory protection entry is indicated as an unused static memory protection entry, the MPU may cache a memory protection entry from the memory protection table in a portion of the static MPU register storage which corresponds to the given static memory protection entry. Hence, when software does not need as many static memory protection entries as are supported in hardware, then a portion of the hardware register storage can be reused as a cache to enable local storage of a memory protection entry from the memory protection table, so that entry can be accessed faster than if it had to be fetched from the memory system. This can improve performance. When the given static memory protection entry is marked as unused, then which particular memory protection entry is cached in the static MPU register storage can vary from time to time dependent on the cache replacement policy even if the processing circuitry has not performed any MPU parameter configuration operations.

Hence, when the static memory protection entry is marked as used (i.e. it does not have the unused indication set), then the data in that part of the static MPU register storage may remain stored until reconfigured by an MPU parameter configuration operation, but when the static memory protection entry is indicated as unused then it may be used as a cache in which case there may be a change in the particular entry provided in the static MPU register storage depending on the pattern of address access as carried out by the processing circuitry. For static memory protection entries which are not marked as unused, there may also be a separate enable/disable indication which when set to enabled means that the entry is valid and can be hit against by the target address of a memory access request, whereas for disabled entries the MPU may always return a miss even if the target address matches the region defined by the disabled entry. A disabled entry may be different to an unused entry in that the portion of the static MPU register storage corresponding to a disabled static memory protection entry cannot be used as a cache to cache entries from the memory protection table in memory. Software could temporarily disable a particular static memory protection entry so that accesses to that address range are rejected, but continue to keep the static memory protection entry within the static MPU register storage so that it can later be re-enabled if necessary, whereas with an unused static memory protection entry this means that the corresponding register storage can be used as a cache to improve performance but the contents of the static MPU register storage from before the unused indication was set are not guaranteed to be retained.

The MPU may comprise MPU cache storage to cache at least one memory protection entry of the memory protection table. The MPU cache storage could be the static MPU register storage in cases when entries are marked as unused as discussed above. However, it can also be useful to provide dedicated MPU cache storage provided to cache entries from the memory protection table, which acts as a cache regardless of how the static memory protection entries (if provided) have been configured. The MPU cache storage could be implemented using a further set of registers within the MPU, similar to the static MPU register storage, or could be implemented using a different type of data storage such as SRAM. In some cases the static MPU register storage and the MPU cache storage may be part of the same storage structure, with some parts partitioned for use as the cache storage and other parts partitioned to store the statically configured memory protection entries.

Hence, MPU cache storage is provided to cache at least one memory protection entry of the memory protection table. The MPU memory access circuitry may use a cache replacement policy (e.g. least recently used, round robin, etc.) to determine which set of memory protection entries from the memory protection table are cached in the MPU cache storage at a given time. This means the MPU cache storage can be updated even if the processing circuitry has not executed any MPU parameter configuration operation, in contrast to the parts of the static MPU register storage which store static memory protection entries not marked as unused.

In response to the memory access request issued by the processing circuitry, the MPU memory access circuitry may determine whether to initiate the at least one MPU memory access request depending on whether the target address is within the corresponding address region specified for any memory protection entry stored in the MPU cache. For example the MPU cache storage may be looked up first and if there is a hit in the MPU cache storage then there may be no need to initiate any MPU memory access request. The cache replacement policy may aim to retain the memory protection entries predicted to be most useful in the future so as to reduce the fraction of memory access requests which require the MPU memory access requests to be issued. Hence, the at least one MPU memory access requests may be suppressed if there is a hit in the MPU cache storage.

The processing circuitry may be responsive to an entry identifier query instruction to retrieve an entry identifier identifying a position in the memory protection table from which a given memory protection entry was obtained. For example the entry identifier query instruction may specify a target address and in response the processing circuitry and/or MPU may return an indication of the entry identifier of the memory protection entry which matches the target address. The entry identifier may be made accessible to the software executing on the processing circuitry by writing the retrieved entry identifier to an architectural register of the processing circuitry. The MPU cache storage may specify, for each cached memory protection entry, an entry identifier associated with the position in the memory protection table from which the cached memory protection entry was obtained. This means that for cached memory protection entries the processing circuitry can service the entry identifier query instruction faster because it is not necessary to initiate MPU memory access requests to the memory system in order to identify the entry identifier associated with an address which hits in a cached memory protection entry. Instructions which are able to retrieve the entry identifier of a given memory protection entry (rather than merely returning the access permissions), can be useful for speeding up certain types of security checks or for providing confidence that a piece of code will run with a deterministic time. By executing the entry identify query instruction for a given pair of addresses, then if both entry identifier query instructions return the same entry identifier then it can be determined that the entire address range between the pair of addresses corresponds to the same memory protection table entry, so that it can be guaranteed there will be no faults due to an access to an unmapped address region between the pair of addresses specified. This may also improve performance because it may mean that a single access permission check for the entire address range could be performed when it has been established that the range falls entirely within a single memory protection region, rather than needing separate checks for each individual address within the range. Hence, caching the entry identifier associated with the cached memory protection entry in the MPU cache storage, in addition to any parameters of the entry itself can be useful for speeding up performance of processing circuitry when executing such an entry identifier query instruction.

The processing circuitry may allow operation in a plurality of security states, each state may be sub divided into a plurality of privilege levels. The processing circuitry may permit fast transitions between security states, for example by allowing branches to code in other security states. Each of the plurality of security states may have an associated memory protection table to be used when the processing circuitry is executing instructions in that security state. To reduce the amount of MPU cache storage required, the MPU cache storage may be shared between the plurality of security states with each entry within the cache specifying a security state identifier for identifying the security state in use by the processing circuitry when the protection table the entry was obtained from a memory protection table. The MPU may suppress usage of cached entries stored in the MPU cache storage for which the security state identifier identifies a security state different to the current active security state of the processing circuitry. Hence, entries associated with inactive security states may remain cached in the MPU cache storage, but are not detected as matching the target address when the currently active security state table is different from the security state identified by the security state identifier. This enables improved performance when switching between different security states since even if the active security state is reconfigured by the processing circuitry, if the active security state is later switched back to the previously active security state then some cached memory protection entries associated with that security state may still remain in the cache and hence can be accessed faster to improve performance.

Alternatively, instead of tagging cached memory protection entries with a security state identifier, another approach could be to invalidate all entries in the MPU cache storage in response to the active security state being modified by the processing circuitry. While this may require the cache to be repopulated with entries from the memory protection table associated with newly active security state after the active security state is switched, this approach may make the MPU cache storage smaller since there is no need to provide a security state identifier field for each cached memory protection entry.

The MPU cache storage may specify, for each cache memory protection entry, a table identifier associated with the memory protection table from which the cached memory protection entry was obtained. Multiple separate memory protection tables could be established within the memory system, for example different tables corresponding to different pieces of software. Each memory protection table could be identified by a given table identifier. For example the table identifier could be an arbitrary numeric value assigned to the table, or an indication of the base address of the memory protection table could be used as the table identifier. The apparatus may have an active table identifier register for storing an active table identifier which identifies an active memory protection table which is currently to be used for checking access permissions to memory. The MPU may suppress usage of a cached memory protection entry stored in the MPU cache storage for which the table identifier associated with the cached memory protection entry is different to the active table identifier stored in the active table identifier register. Hence, entries associated with inactive memory protection tables may remain cached in the MPU cache storage, but are not detected as matching the target address when the currently active table is a different memory protection table. This enables improved performance when switching between different software processes using different memory protection tables since even if the active table identifier register is reconfigured by the processing circuitry to switch to a different memory protection table, if the active memory protection table is later switched back to the previously accessed table then some cached memory protection entries associated with that table may still remain in the MPU cache storage and hence can be accessed faster to improve performance.

Alternatively, instead of tagging cached memory protection entries with a corresponding table identifier, another approach could be to invalidate all entries in the MPU cache storage in response to the active table identifier register being modified by the processing circuitry. While this may require the cache to be repopulated with entries from the newly active memory protection table after the active table is switched, this approach may make the MPU cache storage smaller since there is no need to provide a table identifier field for each cached memory protection entry.

In response to a memory protection cache invalidation operation, the processing circuitry may trigger the MPU to invalidate one or more cached memory protection entries stored in the MPU cache storage that meet an invalidation condition. For example the memory protection cache invalidation operation may be a specific instruction executed by the processing circuitry. The memory protection cache invalidation operation could specify one of a number of different criteria for the invalidation condition. For example a first type of cache invalidation operation may specify that all entries of the MPU cache storage should be invalidated. A second type of memory protection cache invalidation operation may identify a specific address or address range of cached memory protection entries to be invalidated, with cached memory protection entries defining regions which do not partially or fully overlap with the specified address range being preserved. Other options for invalidation conditions may be that cached memory protection entries should be invalidated if they correspond to at least one of a particular table identifier, security state identifier, or have an entry identifier within a specific range. Hence there a number of different options for controlling invalidation of entries from the cache. This can be useful because when the processing circuitry under control of the software reconfigures part of the memory protection table to change the parameters specified for particular address regions, then invalidation of the corresponding entries from the MPU cache storage can also be triggered to ensure that old values of the access permissions are not retained in the cache.

Memory protection entries in the memory protection table stored in the memory system may include an indication of whether the memory protection entry is an enabled entry providing valid access permissions or a disabled entry providing invalid access permissions. This can be useful for temporarily disabling access to certain address regions, while preserving the region parameters in the disabled memory protection entries so that they do not need to be reconfigured once the region is later enabled. The MPU cache storage may be prohibited from caching a disabled entry of the memory protection table. For example the MPU memory access circuitry when looking up the table may return a hit signal only for enabled entries and a memory protection entry may be allocated to the MPU cache storage only if a hit is detected in the memory protection table in memory. It can be useful to avoid caching of disabled entries from the memory system, because this means that dummy entries can be inserted into the memory protection table within memory for possible use later on and these entries can be configured and enabled without the need to invalidate any cached entries.

The table identifier of the active memory protection table could be represented in different ways. In one example the table identifier may be identified using a base address alone. Alternatively, in some cases the table may be identified using a combination of a base address and a size. This could be useful if the memory protection tables to be accessed by two different software processes partially overlap, so that the shared part of the memory protection table could be stored at addresses starting at the base address and then the part of the memory protection table only to be used for one particular software process could be located at a subsequent portion of the address space, so that switching between the different memory protection tables accessed by the different pieces of software can be carried out simply by changing the size indication to indicate how large the active memory protection table is. In some cases the base address and size could be specified in a single register of the MPU. However, in systems supporting relatively large addresses, the base address and the size indication may not fit in one register and so sometimes separate registers may be required. Hence, a base address register may be provided to store a base address of an active memory protection table to be accessed by the MPU memory access circuitry in response to the memory access request issued by the processing circuitry, and a size register may be provided to store an indication of a size of the active memory protection table. It will be appreciated that both the base address register and the size register could also specify other parameters in addition to the base address and size respectively.

When the base address and size of the active memory protection table are specified in different registers, then this may mean that separate MPU configuration operations may be required to be executed by the processing circuitry in order to update the base address and the size of the active memory protection table respectively. This could risk a race condition where undefined behaviour occurs in a period between a first configuration operation to update one of the base address and size and a second configuration operation to update the other of the base address and the size, because changing one of the base address and size but not the other could risk the region indicated as being the active table including information intended to be a memory protection entry.

To reduce this risk, in response to a predetermined type of MPU configuration operation specifying that one of the base address and the size of the active memory protection table is to be updated, in addition to updating that one of the base address and the size, also the processing circuitry may update the other one of the base address and size to an invalid value indicating that there is no active memory protection table. By effectively disabling access to the memory protection table altogether when one of the base address and size has been updated, then until the other has also been updated then there cannot be any incorrect operation resulting from an MPU memory access request which accesses a part of the address space not intended to be part of the memory protection table.

In one implementation, the predetermined type of MPU configuration operation may be an operation specifying that the base address is to be updated, and may specify that the size is to be cleared to an invalid value indicating that there is no active memory protection table. Hence the one of the base address and size specified to be updated by the predetermined type of MPU configuration operation may be the base address. This may be simpler to implement. The predetermined type of MPU configuration operation could be a dedicated instruction or command, but could also simply be a general store instruction executed by the processing circuitry which specifies as its target address an address mapped to the base address register or size register which specifies the one of the base address and the size which is not to be set to an invalid value. In some cases all MPU configuration operations which update the base address or the size may also clear the other one to the invalid value. Alternatively this may not always be required and only certain types of MPU configuration operation may clear the other one of the base address and the size to the invalid value. For example the particular type of instruction used to trigger the MPU configuration operation could signal whether or not the other one of the base address and the size which is not being configured to a specified value by the operation should also be cleared to invalid. In other examples the "clear size to invalid" control may be activated by a bit of the base address register itself, so that if the base address register is written to and a "clear size to invalid" flag is set in the new value to be written to the base address register, then the MPU will also clear the size to an invalid value.

The MPU memory access requests issued by the MPU to obtain entries from the memory protection table may themselves need to be checked against certain access permissions. However it may be undesirable to check whether the MPU memory access request is permitted based on the memory detection table itself, since this could lead to a recursive set of lookups to the memory protection table which could lead to potentially non-deterministic response times or a never ending loop of requests that causes a lockup. Different approaches may be used to handle checking of the MPU memory access request themselves. In one example the permission checking circuitry may determine whether the at least one MPU memory access request is permitted based on a default set of access permissions specified independently of the memory protection table. Hence, by using a default set of permissions, which for example could be hardwired or specified in a configurable register of the MPU, there is no need to lookup the memory protection table in memory to determine whether the MPU is allowed to issue a memory access request to a particular address. This can help to improve real time handling.

Alternatively, or as well as checking the MPU memory access request against the default set of access permissions, the permission checking circuitry could determine whether the MPU memory access request is permitted based on whether the address of the at least one MPU memory access request is in at least one of a plurality of address ranges specified by a plurality of memory security configuration registers. For example, the memory security configuration registers may specify information defining which address ranges can be accessed from a given one of the plurality of security states discussed above. For example, some systems may support defining a secure part of the address space which can only be accessed by certain secure processes and a non-secure part of the address space which can be accessed by either secure or non-secure processes, and so the MPU memory access request may need to be checked against the secure/non-secure regions defined by the memory security configuration registers. In this case MPU memory access requests triggered by non-secure code could be rejected if they target a region defined in the memory security configuration registers as being part of the secure address space. The permissions defined by the memory security configuration registers may be orthogonal to those provided by the memory protection table and the static MPU entries. Hence, as well as the MPU memory access request being checked against the memory security configuration registers, also the memory access requests issued by the processing circuitry in response to an instruction fetch request or a general load/store instruction could also be checked against the memory security configuration registers to check whether they are permitted.

In some examples, a cached memory protection entry may be marked as "locked" by setting a lock indication associated with the entry. The MPU may prevent a locked cached memory protection entry from being evicted from the cache. For example, the MPU may prevent a locked cached memory protection entry corresponding to an address region comprising a stack data structure used for saving architectural state in response to an exception and restoring the saved state in response to an exception return. By locking the entry corresponding to the stack so it cannot be evicted, this ensures a fast exception handling response by reducing delays in state saving/restoring. The MPU can determine which entry corresponds to the stack using a stack pointer address stored in a stack pointer register of the processing circuitry. The locking of the MPU entry associated with the stack could be done at any time. However, in one example, in response to an exception return when state is restored from the stack, the MPU entry associated with the current stack pointer address may be locked, so that if a further exception or interrupt occurs during or just after the exception return, the entry for the stack is still available in the MPU cache storage and so state can be saved faster for the further exception or interrupt.

In other embodiments the use of a locked indication associated with each cached memory protection entry may be avoided by having a dedicated entry within the MPU cache storage that is only used to store the entry from the memory protection table that is associated with the stack data structure. This dedicated entry could be populated at any time. However in one example, in response to an exception return when state is restored from the stack, the MPU entry associated with the current stack pointer address may be populated into the dedicated entry.

In some implementations, when responding to an exception condition the processing circuitry may use lazy state saving. When an exception condition occurs, the processing circuitry may need to save some architectural state to the memory system associated with the outgoing process that was executed before the exception occurred, so that the saved state is preserved even if a process executing after the exception condition overwrites that architectural state. The state associated with the outgoing process can be restored later when processing returns from handling the exception. The saving of state from architectural registers to the memory system may be relatively slow, and so to reduce interrupt handling latency some systems may only save a first portion of the architectural state to the memory system in response to the exception condition itself. A second portion of the architectural state may not be saved directly in response to the exception condition, but could be saved later only if the subsequent software process executing after the exception condition actually accesses the second portion of architectural state. For example the second portion of architectural state may be the contents of floating point registers for storing floating point values, while the first portion of architectural state may be the contents of integer registers. This may be useful because many software processes may not use any floating point registers, and so if the subsequent software process executing after the exception condition never accesses the floating point registers then the state associated with the previously executed process will be retained and so there is no need to perform the state saving and restoring for those floating point registers.

While such lazy state saving can be useful for performance, when the MPU uses a memory protection table stored in the memory system this can cause some complexity. To enable a consistent stack frame to be used in memory to preserve the first and second portions of the architectural state, regardless of whether the second portion of architectural state has actually been saved to memory, in response to the exception condition the processing circuitry may record an indication of a second portion state saving address region at which the second portion of architectural state is to be saved if the subsequent software process accesses the second portion of the architectural state. Hence, when the subsequent software process initiates an access to the registers storing the second portion of architectural state, the processing circuitry may then read the recorded address identifying the second portion state saving address region and then save off the second portion of architectural state to the identified address region. By reserving space for the second portion of architectural state even if it is not yet saved, this means the size of the stack frame for each exception will be the same, so that when exceptions are nested the positions of subsequent stack frames is the same regardless of whether the second portion of architectural state was actually saved. This makes controlling state restoration much simpler.

However, as the memory accesses for saving the second portion of architectural state to the memory system may themselves need to be checked against the MPU, and often in response to the exception condition the active memory protection table may change, the relevant access permissions for checking whether the process executing before the exception condition would have been allowed to save its second portion of architectural state to the address specified for the second portion state saving address region may no longer be available.

Hence, in response to the exception condition, the MPU may record MPU checking information for enabling the MPU, during execution of the subsequent software process to determine whether a memory access for saving the second portion of architectural state to the memory system would satisfy access permissions specified by a memory protection entry of the memory protection table that was active at the time when the exception condition occurred. The MPU checking information could include a number of different types of information. In some cases the MPU checking information could comprise a table identifier (e.g. the base address, and optionally the size) of the memory protection table that was active when the exception condition occurred, so that during execution of the subsequent software process the relevant memory protection table that was previously active can be identified and the appropriate entry can be accessed to check whether the process executing before the exception condition would have been allowed to save state to the address specified for the second portion state saving address region. The MPU checking information could also include an indication of whether the start address and the end address of the second portion state saving address region correspond to the same memory protection entry of the memory protection table that was active when the exception condition occurred. When both the start and end addresses of the second portion state saving address region correspond to the same memory protection entry then this means that a single check of access permissions may be enough to determine that the whole of the second portion state saving address region is permitted to be accessed, avoiding the need to check each individual portion of the second portion state saving address region against entries of the memory protection table that was active when the exception condition occurred. In some implementations the single check of the access permissions may be done when the exception condition occurred, and the results of the check saved, while in other embodiments the access permissions may be saved so that the check can be performed later on, even though the memory protection table may have changed. Hence, by saving some information about the memory protection table that was active when the exception condition occurred, this enables lazy state saving to work even if the active memory protection table changes in response to an exception condition.

A corresponding computer program may be provided for controlling a host data processing apparatus to provide an instruction execution environment for execution of instructions. The computer program may comprise processing program logic and MPU program logic which corresponds in functionality to the processing circuitry and MPU discussed above. Hence, memory access instructions in the program being executed within the instruction execution environment simulated by the computer program may be handled in an analogous way to memory access instructions in a program being executed on hardware which actually comprises the processing circuitry and MPU discussed above. The simulator computer program may present, to software executing on the simulator computer program, a similar instruction environment to that which would be provided by an actual hardware apparatus, even though there may not be any actual hardware providing these features in the host computer which is executing the simulator computer program. The functionality of the hardware architecture discussed above may be emulated by providing program logic, such as sets of instructions or data structures, which enables a generic host computer to execute code intended for execution on an apparatus with the MPU support discussed above, in a manner compatible with the results that would be achieved on an apparatus which actually has such an MPU. The simulator computer program for controlling the host data processing apparatus may be stored on a storage medium. This storage medium may be a non-transitory storage medium.

Table Lookup

The memory protection table discussed above is one example of a control table stored in a memory system which provides information used by a processing component to perform a given operation. In the case of the memory protection table the processing component may be the MPU and the operation performed may be determining whether a given memory access is permitted. Another example of such a control table may be a table defining which regions of the address space are secure regions or non-secure regions, and the operation performed based on the control table may be to determine whether processing circuitry should operate in a secure mode or less secure mode, where the secure mode is selected when the instruction address being processed is within one of the secure address regions defined in the control table. Another example can be a control table which defines, for each address region represented by the control table, an identifier of a software library associated with that region, which could be used by processing circuitry to determine whether a given software library is allowed to call another software library.

Hence, in a range of processing scenarios, it may be useful to provide a control table which has a number of entries each specifying a first limit address and either a second limit address or a size so that the first limit address and the second limit address/size identify limits of a corresponding address region of a variable size within an address space. The entries may be arranged in the control table in order of the first limit address. While supporting regions of variable size for each entry can be useful in reducing the number of entries needed to represent a certain set of properties for a given size of address region (avoiding the need to artificially partition the larger address region into number of separate fixed-size entries), permitting variable size entries can make lookups to the control table more complex to implement. This is because when variable size regions are supported then the position within the table which corresponds to a given address may not fixed, and so in practice to locate the entry which corresponds to a given address some searching through the entries of the table may be required in order to compare the query address with parameters (first limit address and one of the second limit address and size) which define the limits of the corresponding address region. Since the address space could be sparsely allocated with entries in the control table, so that there may be some addresses which do not have any corresponding entry defined for a region including that address, one would expect that the search of the control table would require comparisons against both the first limit address and the one of the second limit address and size used to define the other limits of each address region, and hence may require a large number of comparisons.

In a technique discussed below, table lookup circuitry is provided to perform a binary search procedure to identify whether the control table comprises an entry corresponding to a query address. The binary search procedure includes a number of search window narrowing steps for narrowing a current search window of candidate entries of the control table to a narrower search window which comprises fewer candidate entries. In a given search window narrowing step, the table lookup circuitry narrows the current search window based on a comparison of the query address against the first limit address of a selected candidate entry of the current search window, independent of the second limit address or size of the selected candidate entry. Following a final search window narrowing step which narrows the current search window to a single candidate entry of the control table, the table lookup circuitry may determine that the single candidate entry is the entry corresponding to the query address when the query address is within the corresponding address region defined by the first limit address and the second limit address or size for the single candidate entry.

Hence, with this approach each search window narrowing step only needs to compare the query address against the first limit address for a given selected candidate entry of the control table, so there is no need to load the second limit address or size from the memory system. The second limit address or size only needs to be compared for the single candidate entry that results from the final search window narrowing step. Hence, for a given number of entries N in the control table, this approach allows the number of comparisons to correspond to log 2(N)+1 instead of log 2(N)*2 which would be the case if the second limit address or size had to be checked for each search window narrowing step. This can represent a significant reduction of the number of comparisons required and the amount of data which needs to be loaded from the memory system in order to obtain the respective limits of the candidate entries searched in the binary search procedure. Hence, this can provide a lookup procedure which enables the control table stored in memory to be looked up with better performance, speeding up access to the control table and hence speeding up performance of the operation which relies on the information from the control table.

In the binary search procedure, the single candidate entry identified following the final search window narrowing step may be the only entry of the control table for which the table lookup circuitry, as a consequence of performing the binary search procedure for the query address, triggers a memory access request for obtaining the second limit address or the size from the memory system. Hence, it is not necessary to carry out any loads for obtaining the second limit address or size from the memory system for any entry of the control table other than the single candidate entry. This reduces the number of loads required and hence improves performance. Note that it is not ruled out that, while performing the binary search procedure for looking up the table based on a first query address, there could still be a load performed to obtain the second limit address or the size of a candidate entry other than the single candidate entry from memory, as part of a further lookup which is looking up whether a second query address different to the first query address has a corresponding entry in the table. Multiple lookups to the table could be handled in parallel for different query addresses in which case the second lookup could still require the second limit address or size of a candidate entry other than the single candidate entry identified in the lookup for the first query address. Hence, the restriction of loading the second limit address or size only for the single candidate entry identified following the final search window narrowing step only applies to the set of memory access requests which were triggered as a consequence of performing the binary search procedure for the current query address, and does not rule out loads to other entries of the table for obtaining the second limit address or size which may be triggered as a consequence of other operations being performed in parallel with the binary search procedure for the current query address.

In some implementations there may be a cache in the memory system between the table lookup circuitry and the memory containing the control table. The table lookup circuitry makes a request to the cache, and if the request cannot be satisfied by the cache, the cache may in response make a request to the memory to retrieve the requested data. In some embodiments the cache may request more data than was originally requested, for example it may request enough data to fill a whole cache line. Hence when the table lookup circuitry performs a request to the cache for just the first limit address, the cache may perform a request to memory for a cache line that includes both the first limit address and the second limit address or the size. It will be appreciated that even though the cache is requesting both the first limit address and second limit address or the size, the table lookup circuitry may only need to receive and compare against, the first limit address (except for the single candidate entry identified following the final search window narrowing step), and hence the power used and circuit complexity is reduced.

When the query address is outside the corresponding address region defined by the first limit address and the second limit address or size for the single candidate entry identified following the final search window narrowing step, then the table lookup circuitry may determine that the query address misses in the control table. That is, it may be determined that the control table does not include any entry which relates to an address region including the query address. When the query address misses in the control table, then the table lookup circuitry may perform at least one of: signalling an exception condition and returning default information for controlling the operation to be performed by the processing component.

The comparison performed at each search window narrowing step could be implemented in different ways. In some examples, the comparison may be a less than comparison of the query address against a lower limit address representing the lower limit of the corresponding address region. Hence, in this case the first limit address may comprise a start address of the corresponding address region. When the start address of each region is compared, then when the comparison identifies that the query address is below the start address of the selected candidate entry, then the search window may be narrowed such that at least one entry of the control table having a start address which is greater than or equal to the start address of the selected candidate entry is excluded from the search window.

Alternatively, the comparison at each search window narrowing step could compare the end address identifying the upper limit of the corresponding address region against the query address. In this case the comparison may be a greater than comparison. In this case, when the query address is greater than the upper limit address (end address) of the selected candidate entry, the current search window may be narrowed to exclude from the narrower search window at least one entry of the control table which has an end address equal to or less than the end address of the selected candidate entry.

Different options may be selected for determining whether the selected candidate entry itself remains part of the narrower search window following a given search window narrowing step. When the first limit address is the start address and the comparison determines that the query address is greater than or equal to the start address then it is possible that the query address could be within the corresponding address region for the selected candidate entry, and so the selected candidate entry may remain part of the narrower search window following that search window narrowing step. Similarly, if the first limit address is the end address and the comparison indicates that the query address is less than or equal to the end address for the selected candidate entry, again the selected candidate entry may remain part of the narrower search window.

In some implementations, when the given search window narrowing step determines in the comparison that the query address is outside the corresponding address region for the selected candidate entry (e.g. because the query address is lower than the start address or higher than the end address of the selected candidate entry), then for some implementations the selected candidate entry may be excluded from the narrower search window resulting from the given search window narrowing step. That is, as it is already known that the selected candidate entry cannot be the entry corresponding to the query address, it may be desired to exclude the selected candidate entry from the narrow search window so that subsequent search window narrowing steps may more quickly identify the particular entry corresponding to the query address, as fewer entries need to be considered in the remaining search window narrowing steps.

However, in other implementations when the query address is already known to be outside the corresponding address region for the selected candidate entry, the selected candidate entry may nevertheless remain included in the narrower search window. This may seem counterintuitive as one may not expect it to be useful to include a candidate entry which is already known not to correspond to the query address within the narrower search window. However, in practice including the selected candidate entry within the narrower search window regardless of the outcome of the comparison may permit a more efficient circuit implementation with a reduced critical path timing. For example, the limits of the current search window and the position of the selected candidate entry may in some implementations be tracked using respective entry identifiers. Hence, if the selected candidate entry is to be excluded from the narrower search window, then the start or end of the narrower search window to be used for the next search window narrowing step may need to be calculated from the selected candidate entry identifier by adding one to, or subtracting one from, the identifier of the selected candidate entry. This ±1 operation could require additional hardware to add or subtract the 1 and may be on a critical timing path. Hence, in some implementations it may be faster to identify the entries to include in the narrow search window if, regardless of the outcome of the comparison, the selected candidate entry remains included in the narrow search window. In practice, this is unlikely to result in any additional search window narrowing steps being required compared to the case if the selected case of the selected candidate entry was excluded, since in practice a subsequent search window narrowing step which performs the comparison for a different candidate entry of the narrowed search window may later end up excluding the selected candidate entry identified in the earlier search window narrowing step anyway. Hence, in some implementations by providing logic which sets the narrower search window to start or end at the selected candidate entry, this may permit more efficient control logic which has a shorter critical timing path.

The selected candidate entry within a given search window narrowing step may be any entry of the current search window (including in some cases the entry at one of the outer bounds of the search window). However, the binary search procedure may be more efficient if the selected candidate entry is an entry at an intermediate point of the current search window provided for that search window narrowing step. The intermediate point does not need to be at the exact midpoint of the entries included in the current search window. In fact, when the current search window includes an even number of entries then it is not possible to select an entry at the exact midpoint since whichever entry is selected as the selected candidate entry that entry will be closer to one end of the search window than the other. The maximum limit on the total number of search window narrowing steps required for a given number of entries in the table may be reduced if, at each search window narrowing step, the selected candidate entry is as close to the midpoint of the current search window as possible. However this is not essential and in some implementations any entry at an intermediate point of the current search window could be used, which may result in power and circuit complexity reductions.

Note that in a search window narrowing step when the search window only includes 2 candidate entries, one of the 2 entries is selected as the selected candidate entry, i.e. the selected candidate entry will be at one of the outer bounds of the search window. Hence, in some cases the selected candidate entry may be at an intermediate point of the current search window only for search window narrowing steps where the current search window includes at least 3 candidate entries.

In some implementations the apparatus may have entry storage to store at least one entry. The entry storage could be an entry cache to cache at least one entry of the control table previously obtained from the memory system, and/or static register storage to store at least one further entry configurable by a static entry parameter configuration operation (where each further entry specifies control information for a corresponding address region of variable size within the address space for which limits are identified by a first limit address and one of a second limit address and size). For example in the case where the control table is a memory protection table the entry cache could correspond to the MPU cache storage discussed above and the static register storage could correspond to the static MPU register storage discussed above. Hence, the lookup circuitry may have access to some entries stored locally, in addition to the control table stored in the memory system, to provide faster access to some entries.

Where at least one control table entry is stored in the entry storage, then the table lookup circuitry may check whether the query address corresponds to at least one entry stored in the entry storage and determine whether to perform the binary search procedure depending on whether the query address corresponds to any entry stored in the entry storage. For example the binary search procedure could be omitted entirely in the case when the query address corresponds to an entry stored in the entry storage. For example, if the entry required is already cached in the entry cache, then it may not be necessary to perform any access to memory and so the binary search procedure may be omitted. For the entries in the static register storage, as discussed above for the MPU example, different options may control whether it is necessary to perform the binary search procedure in cases when there is a hit in the static register storage. It is possible in some cases to suppress the binary search procedure from being performed if there is any hit in the static register storage. Alternatively other examples may consider the specific parameters specified within the matching entry in the static register storage to determine whether to perform the binary search procedure (e.g. as discussed above with the MPU example the search of the table within memory may only be required if the parameters for the matching statically configured entry indicate that the memory access is not permitted, but the binary search procedure may be omitted when there is a hit in a statically configured entry which indicates that the memory access is permitted).

In cases when the binary search procedure is performed, in some implementations the table lookup circuitry may use information derived from at least one entry stored in the entry storage to improve the efficiency of the binary search procedure. For example, even when a given query address misses in the entries of the entry cache or the static register storage, the fact that the entry did not match any required comparisons needed to hit against those locally stored entries may provide information which allows the result of some comparisons performed within the binary search procedure to be known already without needing to load any information from memory. For example, the table lookup circuitry may limit the current search window for an initial search window narrowing step of the binary search procedure based on information derived from the at least one entry stored in the entry storage. Also, in a given search step of the binary search procedure, when an outcome of the comparison of the query address against the first limit address of the selected candidate entry is derivable from information in the at least one entry stored in the entry storage, a memory access request for obtaining the first limit address of the selected candidate entry from the memory system could be suppressed. Hence by using information already available from the locally stored entries to guide the binary search procedure, this can avoid unnecessary memory accesses for obtaining information which could already be implicit in the locally stored information, providing faster performance for the binary search procedure.

For example, in one implementation when the entry storage is looked up for a given query address, all the entries in the entry storage may be queried in parallel, to determine which entries (and hence which indexes in the table) are above/below the query address. At this point, the lower bound of the initial search window used for the first search window narrowing step can be the index of the closest entry for an address region below the query address, and the upper bound of the initial search window can be the index of the closest entry for an address region above the query address. Alternatively, an approach which allows the binary search procedure to start with a smaller search window (potentially speeding up the binary search), but which requires some additional circuit logic to add or subtract 1, may be to set the lower bound of the initial search window to the index of the closest entry for an address region below the query address, plus 1; and to set the upper bound to the index of the closest entry for an address region below the query address, minus 1.

The binary search procedure may be designed such that each search window narrowing step provides a binary division of the current search window to obtain the narrower search window. For example the narrower search window resulting from a given search window narrowing step could either be the upper part or the lower part of the current search window, with the one of the upper and lower parts of the search window being selected based on the comparison of the query address against the first limit address for the selected candidate entry.

The binary search procedure may be designed to handle cases where the control table has a number of entries N which corresponds to a power of 2. However, sometimes the control table may have a number of entries N other than an exact power of 2. In this case the table lookup circuitry may perform the binary search procedure with the current search window for an initial search window narrowing step assumed to comprise a number of candidate entries corresponding to the smallest power of 2 which is greater than N. In this case, it is possible that in a particular search window narrowing step the selected candidate entry of the current search window could correspond to a position outside a range of the N entries of the control table. If this happens, the table lookup circuitry may suppress a memory access request for obtaining the first limit address of the selected candidate entry from the memory system and determine, as a result of the comparison to be performed for that particular search window narrowing step, an implicit result which causes the narrower search window to include at least one candidate entry at a position inside the range of the N entries of the control table. Hence, if the number of entries in the control table is not a power of 2 then the binary search procedure can be performed in the same way as if the region table was the next largest power of 2, but for comparisons against entries outside the valid range of the table an implicit result can be returned without actually loading a value from memory. This enables the control table to support any arbitrary number of entries, whilst still enabling the location of the selected candidate entry (e.g. at the intermediate point) to be determined by performing a divide by 2 on the current window size. Since a divide by 2 can be performed by a bit shift operation this may reduce the circuit complexity.

The binary search procedure discussed above can be particularly useful for control tables for which the variable size is permitted to be a number of bytes other than a power of 2 and/or for which start and end addresses of the corresponding address region are permitted to be unaligned to an X-byte address boundary where X is the size of the corresponding address region. Tables having one of these properties can be hard to index into since it is not possible to simply index into the required entry based on the query address. Instead a search procedure for searching through a number of entries of the table and comparing limit addresses may be required. The technique discussed above enables faster searching of this type of table.

In some implementations the first limit address may be stored in the same data word within the memory system as the data word used to store the one of the second limit address and size used to define the other limit of the corresponding address region. A "data word" refers to the size of a portion of data which can be returned from memory in a single memory access request. Even if the first limit address and the second limit address or size are stored in the same data word, it can still be useful to use the binary search procedure discussed above to avoid the need to return the second limit address or size for each selected candidate entry checked in each search window narrowing step. This is because by requiring only the first limit address in each search window narrowing step of the binary search procedure, this means that memory access requests specifying a narrower target portion of data can be used which may permit more efficient memory bandwidth usage because this could preserve space in buffers within the memory system or preserve wires on a bus unused for the memory access request, which could then be reused for other memory accesses, improving the overall efficiency of the memory system. Only requiring a comparison against the first limit address in a search window narrowing step also reduces the amount of comparison circuitry required and may reduce the amount of energy consumed.

However, the technique is particularly useful in examples where, for a given entry of the control table, the first limit address is stored in a different word within the memory system to a data word used to store the second limit address or size for the given entry. In some systems the size of a data word may be comparable with the size of the first limit address or second limit address, and so it may not be practical to store both the first limit address and the second limit address or size within the same data word. In this case, if both the first limit address and the second limit address or size were needed to be obtained at each search window narrowing step, then this would require two separate memory access requests for each search window narrowing step which would increase the pressure on memory bandwidth. In contrast, by using the binary search procedure discussed above the memory request for accessing the second limit address or size for each selected candidate entry can be avoided, with the only entry for which the second limit address or size needs to be loaded from memory being the single candidate entry which results in the final window narrowing step.

While the technique discussed above can be used for any type of control table supporting variable size address regions defined by a first limit address and second limit address or size as discussed above, it can be particularly useful for a memory protection table for which each entry specifies access permissions for the corresponding address region of an address space and the operation performed based on the information in the control table comprises checking of whether a memory access request specifying the query address satisfies the access permissions in a corresponding entry for a region including the query address. Such a memory protection table may need to be accessed often (e.g. on each memory access request, if the required entry is not already stored in local storage circuitry), and so improving the efficiency of the lookup procedure for accessing the memory protection table from memory can have a large impact in the overall processing performance of the processing system which uses the memory protection table.

Again, similar to the MPU examples discussed above, in some cases the system could be implemented using hardware logic. However it is also possible to implement such a binary search procedure within a simulator computer program for controlling a host data processing apparatus to provide an instruction execution environment for execution of instructions, where processing program logic and table lookup program logic provides the same functionality as the processing component and table lookup circuitry discussed above. A storage medium may store the simulator computer program. The storage medium may be a non-transitory storage medium.

Specific MPU Example

FIG. 1 schematically illustrates a data processing system 2 having processing circuitry 4 for performing data processing in response to instructions. For example the processing circuitry 4 may be a CPU, DSP, GPU or other processing element of a data processing system. The processing circuitry 4 may include an instruction fetch unit 5 for fetching instructions from memory system 10 for processing by the processing circuitry, and an instruction decoder 7 for decoding the fetched instructions to generate control signals for controlling execution units 6, 8 to perform data processing operations in response to the decoded instructions. For example the execution units may include an arithmetic/logic unit (ALU) 6 for performing arithmetic or logical operations on operands fetched from registers 12, 14 to generate a result value which may be written back to the registers. The execution units could also include a load/store unit 8 for performing load/store operations for transferring data between the registers 12, 14 and the memory system 10. The registers may include a number of different types of registers including general purpose (integer) registers 12 for storing integer values for processing by the processing circuitry 4, and floating point registers 14 for storing values represented using floating-point representation. The registers accessible to the processing circuitry 4 could also include other types of register not shown in FIG. 1 for conciseness, such as vector registers for storing vector operands comprising multiple independent data elements and/or control registers for storing various control parameters for controlling the operation of the processing circuitry 4, such as condition flags which can be checked by conditional instructions to determine whether to perform a conditional operation, a program counter storing an address representing a current point of execution, and control registers for controlling exception handling for example.

The memory system 10 may include one or more levels of caches as well as main memory. The memory system 10 is accessible by the processing circuitry 4 by executing a load instruction which triggers the load/store unit 8 to issue a memory access request for loading data from the memory system 10 into the registers 12, 14, or a store instruction for triggering the load/store unit 8 to issue a memory access request for storing data from the registers 12, 14 into the memory system 10. Also, the instruction fetch unit 5 issues memory access requests to fetch instructions from the memory system 10. Each memory access request may specify a target address of the location to be accessed. In this example the target address is a physical address directly specifying the location to be accessed, so no address translation is required.

A memory protection unit (MPU) 20 is provided for checking based on the target address whether the memory access request is permitted to be serviced by the memory system 10. Access permissions for controlling whether the processing circuitry 4 is allowed to access a given address region may be defined in two ways. A memory protection table 22 may be stored within the memory system, comprising a number of entries each defining access permissions for a corresponding address region. The MPU 20 has MPU memory access circuitry 24 for initiating memory access requests to the memory system 10 in order to obtain information from the MPU table 22. The MPU memory access circuitry 24 has table lookup circuitry 26 for performing the comparisons needed to identify whether the MPU table 22 includes an entry for an address region comprising the target address specified by the memory access request received from the processing circuitry 4. The memory system 10 may store more than one MPU table, each table 22 associated with a respective software process. An active table identifier, identifying which particular MPU table is to be accessed using the MPU memory access circuitry 24, is stored in an active table identifier register (or group of registers) 28. For example the active table identifier register 28 may specify a base address 30 of the currently active MPU table, and could also optionally specify a size of the active table. MPU cache storage 32 is provided within the MPU for caching selected entries of the MPU table(s) from the memory system 10, so that if the same entry is needed again then it can be accessed faster. For example the MPU cache storage may comprise a set of registers for locally storing entries of an MPU table with reduced access latency compared to the backing store for the MPU table 22 in memory system 10.

Another way to provide access permissions for controlling access to the memory system 10 may be to define statically configured memory protection entries within static MPU register storage 36. The processing circuitry 4 may support instructions for configuring the contents of the static MPU register storage 36, such as a dedicated type of instruction specifically intended for accessing the static MPU register storage, or could use a more general store operation performed by the load/store unit 8 which specifies as the target address an address which has been mapped to the memory mapped registers provided for the static MPU register storage 36. In general, once an MPU parameter reconfiguration operation (e.g. one of these memory mapped load/store operations or the dedicated type of reconfiguration instruction) has been executed to populate contents of the static MPU register storage 36 to define a given memory protection entry corresponding to a given address region, in the absence of a reset or power down event causing loss of information stored in the static register storage 36, that given memory protection entry remains in the static MPU storage 36 until another MPU parameter reconfiguration operation changes the contents of that entry. This is unlike the MPU cache storage 32 for which even if there was no MPU parameter reconfiguration operation to change the actual parameters set for a given address region, the contents of the MPU cache storage 32 may vary over time according to a cache replacement policy. For example the MPU cache storage 32 may be associated with a cache controller which uses a least recently used or similar replacement policy to evict entries predicted to be least useful in future, when space needs to be made for a more recently accessed entry of the memory protection table 22 in memory system 10.

While FIG. 1 shows the static MPU register storage 36 being separate from the MPU cache storage 32, in other examples these could be respective portions of a common storage structure. For example, some entries of a common storage structure could be marked with a flag to indicate that they should be considered to be static entries which are not to be evicted through the cache replacement policy. However, in practice providing separate storage structures 32, 36 may allow more efficient indexing into the cache storage 32.

The MPU comprises permission checking circuitry 40 for reading the access permission data specified in either the looked up entry of the memory protection table 22 stored in the memory system 10 (or cached in the MPU cache storage 32) or a statically configured MPU entry specified in the static MPU register storage 36, and determining whether properties of the memory access request issued by the processing circuitry 4 meet the requirements specified by the access permissions for the entry selected based on the target address of the memory access request. For example the access permissions may specify whether the region is to be a read only region (for which any write request triggered by a store instruction executed by the processing circuitry 4 should be rejected) or is allowed to be both read and written. The access permissions could also specify whether the fetch unit 5 is allowed to fetch instructions from the corresponding address region. The access permissions could also restrict access to the corresponding address region to certain exception levels or privilege levels of the processing circuitry 4, and the permission checking circuitry 40 could check whether a current exception level or privilege level associated with the memory access request meets the restrictions defined in the access permissions.

The memory protection table 22 in the memory system 10 and the static MPU register storage 36 may not be the only source of control information which affects whether the permission checking circuitry 40 allows the memory access. For example the apparatus 2 may also include a security attribute unit (SAU) 42 which comprises memory security configuration registers 44 which define secure and non-secure regions in the address space. The target address of a memory access request is checked by security checking circuitry 46 against the region defining data in registers 44, and the processing circuitry 4 is restricted to accessing the secure regions only when operating in a secure mode of operation (non-secure regions are accessible either in the secure mode or in a non-secure mode). Hence the memory security configuration registers 44 may represent another example of a control data structure for controlling access to memory, which may apply permissions which are orthogonal to the permissions of the MPU table or static MPU register storage 36. That is, an access which would be permitted by the MPU may nevertheless be rejected by the SAU 42, or vice versa. Both the memory access requests initiated by the fetch unit 5 or load/store unit 8 of the processing circuitry, and any MPU memory access requests issued by MPU memory access circuitry 24 to access the memory protection table 22 in memory system 10, may be subject to security checking by the SAU 42. While in the example of FIG. 1 the definition of which memory regions are considered secure or non-secure is defined solely by the contents of the memory security configuration registers 44, in other examples a memory security table similar to the MPU table 22 could be maintained within the memory system 10 to provide further definition of entries defining address regions as secure or non-secure. This would enable support for a larger number of simultaneously defined regions. While the MPU 20 and SAU 42 are shown in FIG. 1 as operating sequentially, some implementations could provide parallel lookups to the MPU and SAU for memory accesses issued by the processing circuitry, to improve performance.

Figure 2:
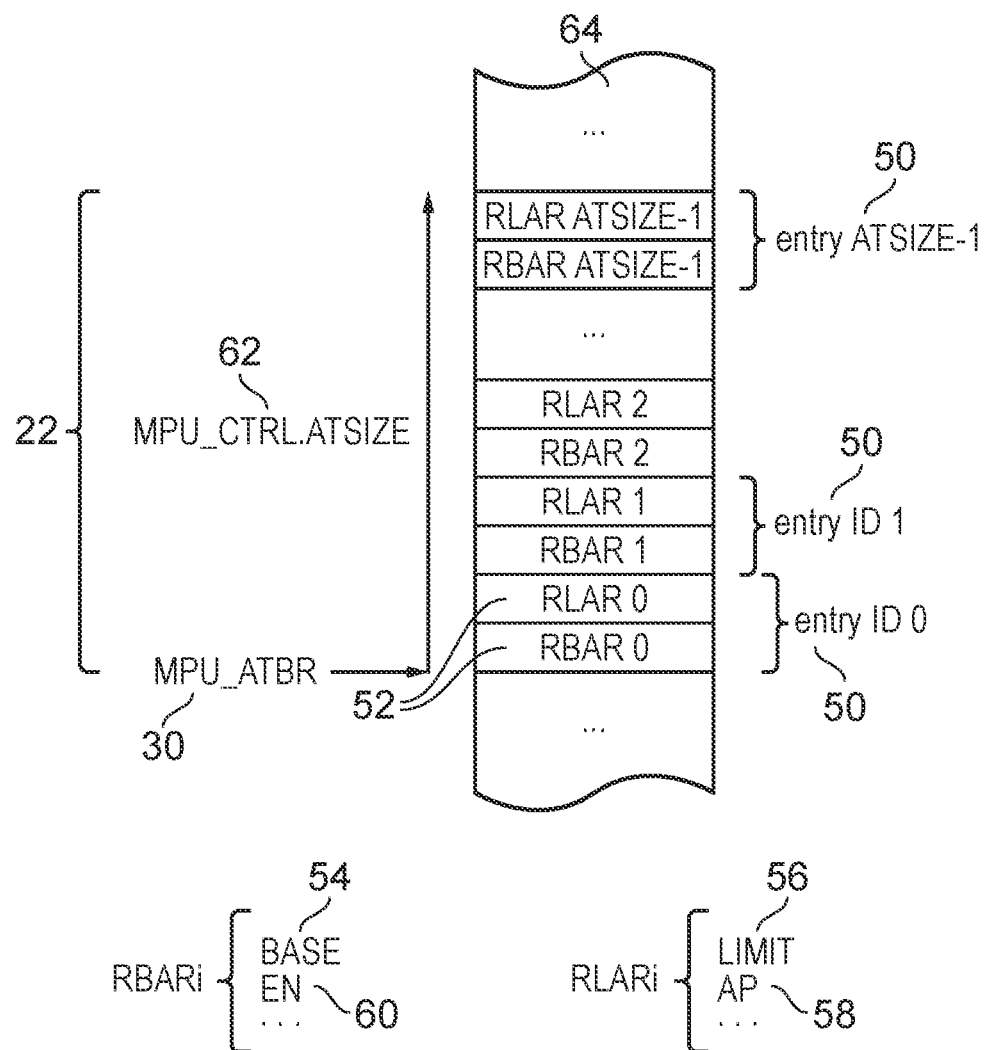
FIG. 2 shows an example of a memory protection table stored in a memory system.

FIG. 2 shows an example of the memory protection table 22 stored in the memory system 10. The memory protection table includes a number of entries 50. In this example each memory protection entry 50 comprises data stored in two adjacent data words 52 of the memory address space. A first data word RBARi provides the base address (start address) 54 of the corresponding address region, while the end address (LIMIT) 56 of the corresponding address region is defined in the second data word, RLARi, of the entry 50. In this example, the access permissions (AP) 58 are specified in the RLAR data word of the entry while an enable flag 60 indicating whether the entry defines an enabled address region or disabled address region is in the RBAR data word, although this information 58, 60 could also be switched to the other data word or could be represented within the same data word. Also each data word 52 of the entry 50 could optionally include other information not shown in FIG. 2. While FIG. 2 shows an example where the start and end addresses 54, 56 of each address region are represented in separate data words in memory, this is not essential and in some implementations these could fit within a single data word, in which case it may not be necessary to provide multiple data words per entry. Also, while FIG. 2 represents the variable size of the address region using a start address 54 and an end address 56, in other examples one of the limit addresses could be represented by a size parameter which defines a size of the corresponding address region relative to the other limit address. The active table ID register 28 identifies the base address 30 of the memory protection table and optionally may identify a size parameter 62 which identifies the total number of entries in the memory protection table. While in FIG. 2 the data words 52 for an entry 50 are adjacent, this is not essential and in some implementations all the RBARi data words could be clustered together in one part of the table, with the RLARi data words clustered together in another part of the table.

The entries 50 of the memory protection table 22 are assigned to addresses within the same address space 64 that is used for addresses of the regular memory accesses issued by the load/store unit 8 or instruction fetch unit 5 of the processing circuitry 4. The memory protection entries 50 are ordered within the address space by their start addresses 54 (and also ordered by their end addresses 56 since the address regions defined by memory protection entries within the memory protection table 22 may not be allowed to overlap). Hence, entry 0 would be the entry corresponding to the address region which has the lowest start address, entry 1 would correspond to the address region which has the next lowest start address, and so on. Note that FIG. 2, shows within the address space 64, the positions of the addresses at which each memory protection entry 50 of the table is stored, not the positions of the corresponding address regions for which the entry defines the access permissions. It will be appreciated that the particular format of each entry 50 shown in FIG. 2 is just one example and other formats may be used to represent the same information.

Figure 3:
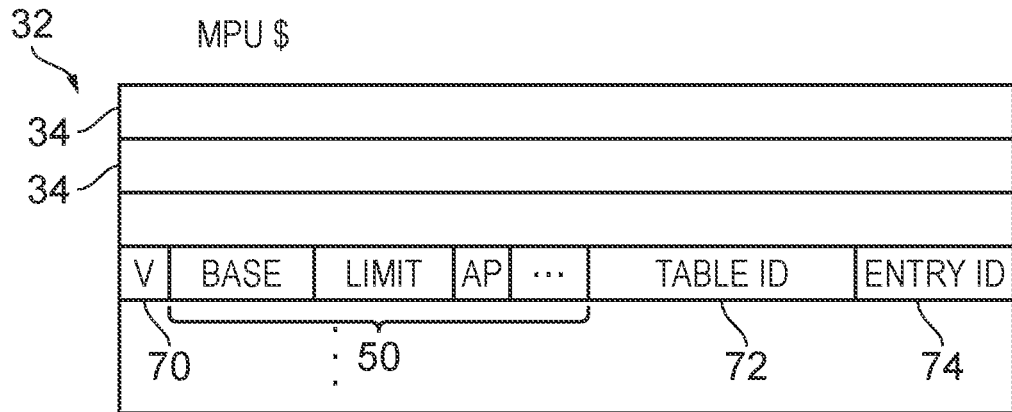
FIG. 3 shows an example of MPU cache storage for caching memory protection entries from the memory protection table.

FIG. 3 shows an example of the MPU cache storage 32, which comprises a number of cache entries 34, each cache entry 34 for caching one of the memory protection entries 50 from the memory protection table 22. As shown in FIG. 3, in addition to the parameters of the corresponding memory protection entry 50, the cache entry 34 may also specify a valid bit 70 indicating whether the contents of that cache entry 34 are valid, and a table identifier 72 identifying the particular memory protection table 22 from which the memory protection entry 50 cached in that cache entry 34 was extracted (this may correspond to the current value of the active table ID register 28 at the time that the cached memory protection entry was allocated to the cache 32). Since it is likely probably that multiple cache entries 34 will have the same table identifier 72, some implementations may choose to reduce the storage required by storing only unique table identifiers 72 in a separate table identifier table within the MPU cache storage 32. In such an implementation each cache entry 34 may store an index to the full table identifier in the table identifier table. Also, each cache entry 34 may specify an entry identifier 74 identifying the position within the corresponding memory protection table 22 from which the memory protection entry 50 which was cached in that particular cache entry 34 was extracted. For example, in the example shown in FIG. 2 if entry ID 1 is extracted from the table and placed in the cache, then the entry ID field 74 may specify a value of 1. The entry ID field 74 can be useful for handling instructions executed by the processing circuitry 4 for checking which entry ID of the memory protection table a given address maps to. By including an indication of the entry ID within each cache entry 34, this means that if the address specified by the instruction matches one of the regions defined by the cached memory protection entries within the cache storage 32, then the entry ID 74 of that entry can simply be read from the cache, rather than needing to be determined from the access to memory.

The table ID 72 is used to qualify lookups in the cache. When the cache is looked up to determine whether the cache contains a memory protection entry corresponding to a given address, only cache entries 34 for which the table ID field 72 matches the active ID stored in the active table ID register 28 may generate a hit. Cache entries 34 which contain a different table ID to the active table ID will generate a miss even if the query address supplied to the cache is between the base address and limit address in the parameters cached for the corresponding memory protection entry 50.

Note that the cache entry 34 need not have space for the enable flag 60 which is provided in each memory protection entry 50 stored in memory within the memory protection table 22. This is because the cache 32 may be prohibited from caching disabled memory protection entries. As all the memory protection entries cached in the MPU cache storage 32 may be enabled entries, then the enable flag 60 would be redundant within the cache entry 34. By prohibiting caching of disabled entries this means that software executing the processing circuitry can include disabled memory protection entries within the MPU table 22 which define regions which could be activated later, and then when those regions do need to be activated so that address accesses will then become permitted, this can be done simply by setting the enable flag 60 in the corresponding memory protection entry of the memory protection table 22 without needing to trigger any cache invalidations from the MPU cache storage 32.

Cache indications from MPU cache storage 32 can be triggered by the processing circuitry 4 executing an MPU cache invalidation command. Variants of the MPU cache invalidation command may trigger invalidation of all cached entries, or of entries meeting a condition specified by any one or more of an address or address range, table ID or entry ID.

Figure 4:
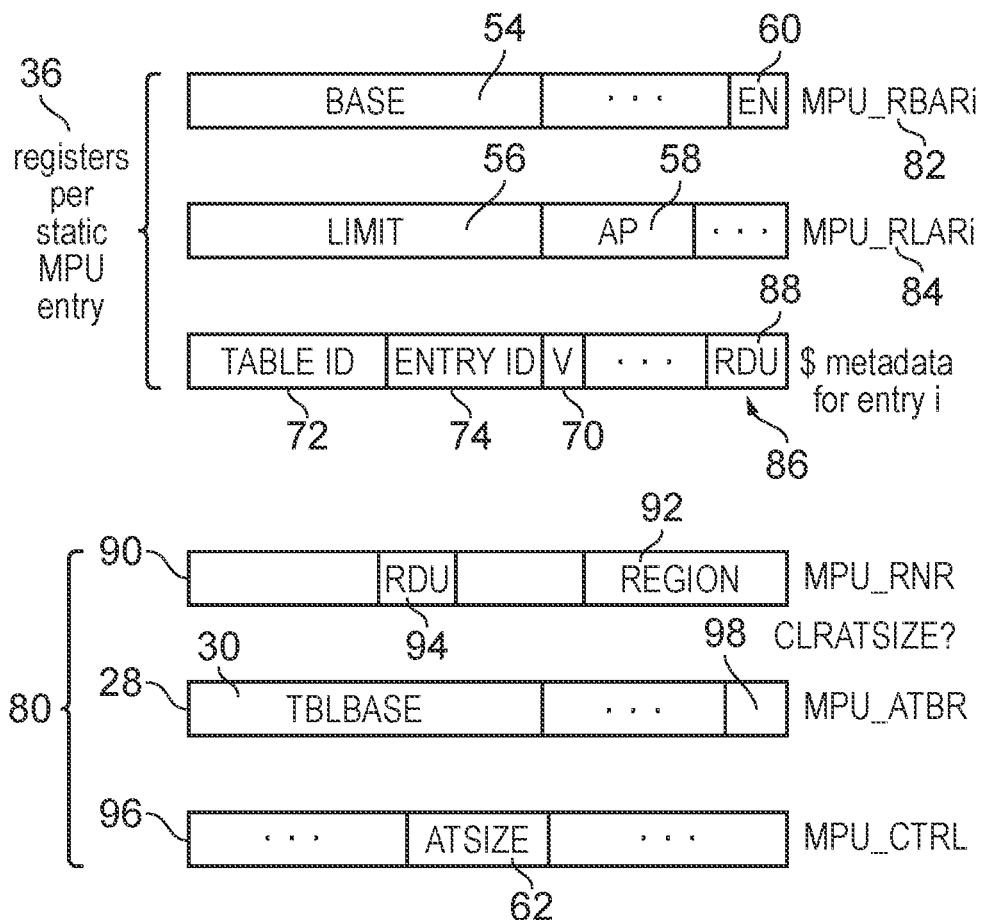
FIG. 4 shows an example of register storage of the MPU.

FIG. 4 shows an example of the static MPU register storage 36 as well as various control registers 80 provided within the MPU 20.

For the static MPU register storage 36, FIG. 4 shows a set of three registers provided per static MPU entry. That is, for each static MPU entry supported in hardware within the MPU register storage, a separate instance of the three registers 82, 84, 86 may be provided. Register 86 is optional. Registers 82 and 84 together represent the corresponding static MPU entry, with a similar contents to a given memory protection entry 50 of the memory protection table 22. Hence, the registers 82, 84 may specify a base address (start address) 54 and limit address (end address) or size 56, access permissions 58 and an enable flag 60 controlling whether the entry is enabled (able be used for checking permissions of the memory access request) or disabled (so that a memory access request cannot be validated based on the contents of this entry, although when disabled the remaining parameters of the registers 82, 84, 86 should be retained until subsequently reconfigured). It will be appreciated that the particular formatting of the registers 82, 84 is just one example and the same information could be rearranged or represented through different fields. Also the registers 82, 84 may store other information not shown in FIG. 4. Also, in some cases the contents of a statically configured MPU entry could be represented by a single register.

Hence, when a static MPU entry defines an address region which matches the target address of the access request sent by the processing circuitry 4, and the entry is enabled, then the access permissions 58 defined in that matching static MPU entry may be used to validate whether the access is allowed. In this case, it may not be necessary to access the memory system 10 in order to validate the access request.

The additional metadata register 86 associated with the corresponding static MPU entry represented by registers 82, 84 is optional, but if provided may enable more efficient performance. The metadata register 86 specifies a register disabled and unknown (RDU) field 88 which, if set to 1, indicates that the registers 82, 84 associated with the corresponding static MPU entry are not currently being used to store a static MPU entry. If the RDU field 88 is set to 1, then this indicates that the registers 82, 84 can be used as an extension of the MPU cache storage 32 to cache the contents of a corresponding memory protection entry from the MPU table 22 stored in the memory system 10. This can enable better performance by effectively increasing the capacity of the MPU cache storage 32 when the software does not require the full number of static MPU entries that are supported in hardware. The remaining parts of the metadata register 86 may specify the additional cache fields 70, 72, 74 which are provided for each cache entry 34 within the cache storage 32 which would not otherwise be provided in the static registers. Note that when a particular entry in the static registers is set to be unknown using the RDU flag 88, then this is different to an entry being set as disabled using the enable flag 60. When an entry is disabled but not marked as unknown, then the contents of registers 82 and 84 are retained and these registers cannot be used as cache storage. For example, software may wish to temporarily disable a particular static entry so that memory accesses to that region of the address space cannot be validated using that entry, but retain the parameters in those registers 82, 84 so that later the region can be enabled again without needing to reprogram the static MPU registers (other than setting the enable flag 60). When a static region is set to be unknown using the RDU flag 88 the enable flag 60 may not be required for the entry cached in the static region set as unknown, since the cache may be prohibited from caching disabled memory protection entries as discussed above. Hence some implementations may choose to have a single shared valid/enable flag instead of the separate enable flag 60 and valid flag 70.

The control registers 80 include a region programming register 90 used for programming the contents of the static MPU entries. Each of the control registers 80 is a memory mapped register which can be accessed by performing a load/store operation specifying as the target address a memory address mapped to that particular register. To avoid having to separately assign addresses to each individual entry of the set of static MPU entries provided (e.g. for each of the 8 or 16 sets of static MPU entry storage provided in hardware), the respective versions of the first static MPU register 82 for each of the entries supported in the static MPU register storage may share the same memory mapped address (and similar for address sharing registers 84). To select which particular version of register 82 or 84 is to be written to, the software can first write to the region programming register 90 a region identifier 92 which corresponds to the particular one of the static MPU entries to be written to, and then a subsequent MPU reconfiguration operation (a store instruction specifying as a target address the address mapped to register 82 or 84) may be executed and the region number 92 already placed in the programming register 90 may specify which static MPU entry is the one to be updated. The programming register 90 may also include an RDU field 94 which specifies whether the region for which the region identifier 92 is specified in the programming register 90 is to be set as disabled and unknown through the RDU field 88 of the metadata register 86. Again, the use of the programming register 90 shared between the set of static MPU register entries to set the RDU field means that it is not necessary to provide a separate memory mapped address for each metadata register 86.

As shown in FIG. 4 the control registers also include the active table ID register 28, which in this example specifies the base address 30 of the active table as the active table identifier. The size of the active table is specified in a separate size parameter 62 which is specified within a further control register 96. The remaining fields of the registers marked with dots in FIG. 4 could be used to store other information. In this example the register 28 containing the table's base register 30 also includes a clear active table size field 98. As in the example of FIG. 4 the base address 30 and the size 62 of the active MPU table 22 are stored in different registers, this may mean that different MPU parameter configuration operations may be required in order to set the base address and size respectively. Hence, if both the base address and size need to be changed then there could be a period between changing one of the base address and size and changing the other, during which the parameters defining the active table within the control registers 80 effectively define a region of the address space which may include data words which have not been programmed with memory protection entries 50. This could risk a memory access operation being checked against data not intended to define a memory protection entry, which could lead to indeterminate results which could potentially break the security checks implemented by the memory protection table. Some implementations of MPU cache storage 32 may permit prefetching of entries from the memory protection table 22. Since such prefetching may occur at any point, and may not be directly triggered by instructions executed by the processing circuitry 4, it can be difficult to ensure that invalid entries outside a memory protection table 22 are not cached. This problem can be addressed by providing the clear active table size field (CLRATSIZE) 98 in the register 28 containing the base address 30. When reconfiguring active table ID register 28, if the new data to be placed in that register specifies the CLRATSIZE field 98 equal to 1, then in addition to updating the contents of that register, the active table size 62 in register 96 is also cleared to 0, which effectively indicates that there is no active table 22 in the memory system 10. This prevents any memory access request being inappropriately permitted based on a data word which is incorrectly assumed to be part of the memory protection table 22 after only the base address but not the size has been updated. A subsequent MPU reconfiguration operation can then update the address translation size within register 96 to the appropriate value for the new active table. On the other hand, if the new values to be written to register 28 have the CLRATSIZE field 98 set to 0, then in response to this operation only the contents of the active table ID register 28 which specifies the base address 30 would be updated, and in this case the size 62 in register 96 would be left unchanged. This would be more appropriate if switching between two memory protection tables of the same size.

Figure 5:
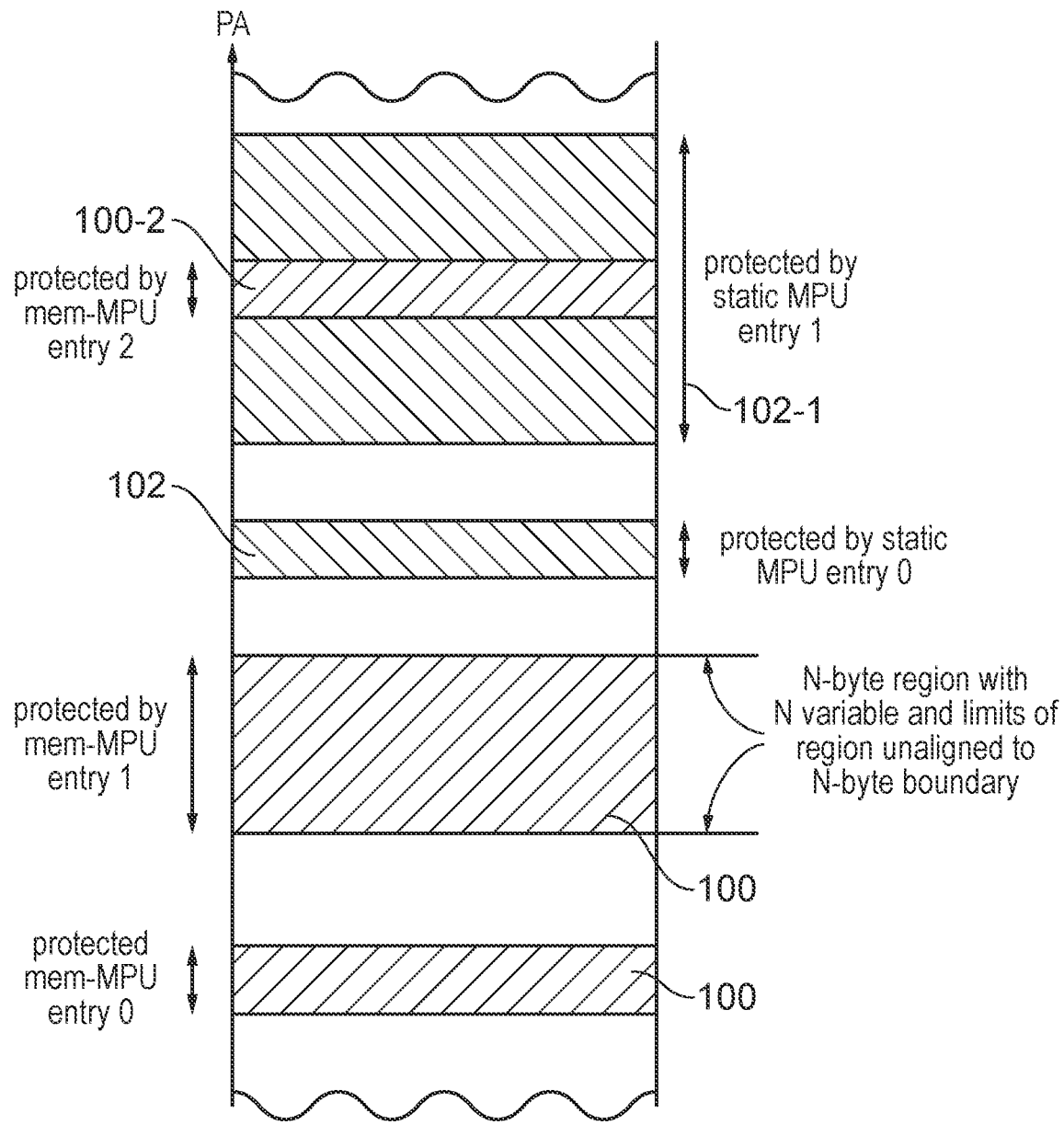
FIG. 5 shows how different address regions of the address space can be covered by memory-based MPU entries or static MPU entries.

FIG. 5 schematically illustrates a portion of the address space covered by different memory-based MPU entries 50 of the memory protection table 22 or statically configured MPU entries within the static MPU register storage 36. In this example, the address space is a physical address space, so memory access requests issued by the processing circuity 4 specify physical addresses directly corresponding to corresponding locations within the memory system, and are checked against memory protection entries which define corresponding regions of the physical address space. Regions 100 marked in FIG. 5 correspond to three different memory-based memory protection entries 50 of the memory protection table 22. Note that the memory protection table 22 may define sparsely-set regions of the address space, and there may be gaps between the corresponding address regions defined by successive entries of the memory protection table.

On the other hand, regions 102 correspond to two respective static MPU entries represented by the static MPU register storage 36. Hence, whereas the access latency for locating a given memory-based MPU entry from the memory protection table 22 may vary depending on whether that entry is in the MPU cache storage 32, the accesses to the static regions 102 which correspond to the static MPU entries can be deterministic, as the static regions will remain configured until the processing circuitry 4 executes an instruction for reconfiguring parameters defining the access permissions or the extent of the static regions defined by a given static MPU entry. Hence, the software may determine certain critical regions of the address space for which accesses may need to be handled quickly and/or with a deterministic latency, and by using the static MPU regions for handling those accesses this can be better for real time applications. Meanwhile, by supporting a variable number of memory protection entries 50 within the memory protection table 22 stored in memory, this enables a greater number of total memory regions to be defined simultaneously, reducing the frequency of faults caused by a lack of a defined memory protection entry for a given address. Hence this hybrid approach provides a better balance between performance and hardware cost, especially for systems which involve real time processing or need deterministic access latency but have constrained memory capacity.

As shown in FIG. 5 it is possible for a region covered by a memory protection entry of the memory protection table 22 to overlap with a statically configured address region corresponding to a static MPU entry. In this case, the overlap can be handled in different ways. In some embodiments, if the target address of a memory access request hits in the static MPU register storage 36 then the access permissions defined by the static MPU entry which matched may take priority, and overrule any conflicting attributes specified in a matching memory-based MPU entry of the MPU table 22. In this case there may be no need for any memory access request to be initiated by the MPU memory access circuitry 24 once there is a hit in the static MPU register storage 36.

Alternatively, in the case where there is a hit in the static MPU register storage and the memory access request satisfies the access permission specified by that matching static MPU entry, then the MPU memory access may be suppressed so that there is no access to the memory protection table 22, but if the memory access request fails to satisfy the access permissions specified in the matching static MPU entry, then MPU memory accesses could still be triggered by the MPU memory access circuitry 24. If the memory protection table 22 includes a matching MPU entry for an address region including the target address, then if that matching memory-based MPU entry permits the access to be performed then the memory access may be allowed, even though the static MPU entry for the same address did not permit the memory access. Enabling overlaps between static and memory-based MPU entries in this way can be useful for setting up permissions for a more privileged process which is able to access a wider range of the address space, and also to allow a less privileged process access only to a restricted subset of the address range available to the more privileged process. For example region 102-1 represented by the static MPU entry could restrict access to the higher privilege process, so addresses within the subrange 100-2 accessed by less privileged code would fail to satisfy the access permissions specified by the static MPU entry, but could pass permission checks implemented based on the corresponding memory-based MPU entry relating to region 100-2. This avoids any need to split region 102-1 into separate entries representing the parts of region 102-1 either side of region 100-2.

Figure 6:
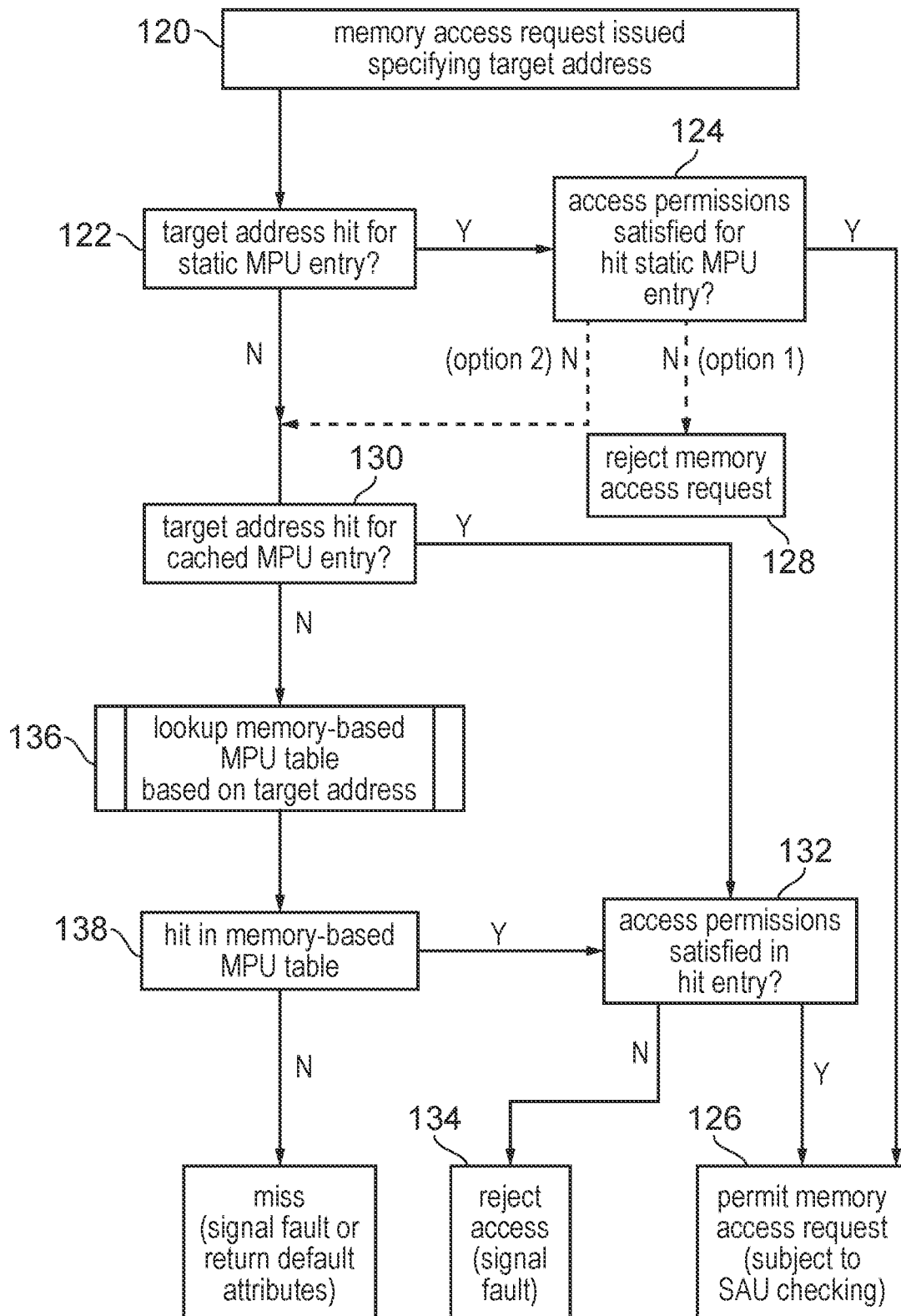
FIG. 6 is a flow diagram showing a method of controlling access to the memory system using the MPU.

FIG. 6 is a flow diagram illustrating a method of checking whether a memory access is permitted by the MPU. At step 120 the processing circuitry 4 issues a memory access request specifying a target address. The memory access request could be an instruction fetch request issued by the instruction fetch circuitry 5 or could be a data access request (load or store operation) issued by the load/store unit 8. At step 122 the MPU 20 determines whether the target address hits against a static MPU entry stored in the static MPU register storage 36. That is, the permission checking circuitry 40 detects whether the target address is within the corresponding address region for any of the static MPU entries. If so, then at step 124 the permission checking circuitry determines whether the access permissions specified in the hit static MPU entry are satisfied. If the access permissions are satisfied by the memory access request then at step 126 the memory access request is permitted by the MPU. In systems comprising an SAU 42, there may also be additional security checks performed by the security checking circuitry 46 of the SAU 42 to determine whether the memory access request is permitted, so even if the MPU permits the memory access request at step 126, it is possible that the request could still be rejected by the SAU 42. However, subject to SAU checking, the memory access request is permitted by the MPU 20.

If the access permissions are not satisfied by the memory access request at step 124, then there are alternative options for how the MPU could respond. In a first option, when the target address hits against the static MPU entry but that static MPU entry specifies access permissions which are not satisfied by the memory access request, then at step 128 the memory access request could be rejected. In this case the MPU may trigger signalling of a fault condition or exception. Alternatively, in a second option the method may proceed to step 130 the same as if the target address missed in the static MPU register storage at step 122.

Hence, if either there was a miss for the target address in the entries in the static MPU register storage 36, or there was a hit but the memory access request fails to satisfy the access permissions and the system implements option 2, then the method proceeds to step 130 where the permission checking circuitry 40 detects whether there is any hit of the target address in the MPU cache storage 32. Note that while some systems may look up the MPU cache storage 32 only if there has not been a hit (or a hit with satisfied access permissions) in the static MPU register storage 36, i.e. with the sequential flow of steps shown in FIG. 6, in some alternatives to improve performance the cache could be looked up in parallel with the static MPU register storage so that in the event that a lookup to the cache is required in the case that the static MPU register storage cannot definitively provide a determination of whether the memory access request should be permitted or rejected, then the cache lookup has already been initiated enabling the cache response to be available earlier. Nevertheless, the static MPU entries may take priority over the cache MPU entries, even if they are looked up in parallel.

Hence, if the target address hits (i.e. is within the corresponding address region) for a cached MPU entry which is valid within the MPU cache storage and which corresponds to the same MPU table as currently identified as the active table in the active table ID register 28, then at step 132 the permission checking circuitry determines whether the access permissions specified in the hit entry of the MPU cache storage are satisfied. If so, then again at step 126 the memory access request is permitted, subject to any SAU checking that may be required. If the access permissions specified in the hit entry of the MPU cache storage 32 are not satisfied at step 132 then at step 134 the memory access request is rejected and a fault may be signalled.

If at step 130 the target address was determined to miss in all of the entries of the MPU cache storage 32 (i.e. there is no cached entry which specifies as the same table ID as the active table ID and which corresponds as the memory address region which includes the target address) then at step 136 the table lookup circuitry 26 triggers the MPU memory access circuitry 24 to initiate one or more MPU memory access requests for looking up the memory-based MPU table 22 based on the target address. The lookup process is discussed in more detail with respect to FIG. 7 below. The MPU memory access requests triggered by the MPU memory access circuitry during the lookup may be validated against a set of default access permissions and/or may be checked against the security regions defined in the memory security configuration registers 44 by the SAU 42. Hence, for the MPU memory access requests initiated as part of the MPU table lookup, it is not necessary to check those memory accesses against the static MPU register storage 36 or the memory protection table 22. Based on the table lookup process, at step 138 the table lookup circuitry 26 determines whether there has been a hit in the memory-based memory protection table 22. If so then again at step 132 it is determined whether the access permissions specified in the hit entry in the memory detection table are satisfied and depending on whether the access permissions are satisfied then the method proceeds to step 126 or step 134 to permit or reject the memory access as appropriate. As well as checking the access permissions in the hit entry of the memory detection table 22, a cache controller associated with the MPU cache store 32 may also allocate the hit entry of the memory protection table 22 to the cache. If it is necessary to evict a previously cached entry in the memory protection table 22, then the victim entry could be selected by a cache replacement policy such as least recently used for example.

On the other hand, if at step 138 the table lookup circuitry 26 determines that there is a miss in the memory based MPU table 22 for the target address, then no address region corresponds to the target address is currently defined in the memory protection table and so a miss is signalled. In response to a miss in the memory protection table, different options are available for handling the memory access request. In some cases the request could simply be rejected and a fault could be signalled. Alternatively a set of default attributes could be defined which are intended to handle any memory access request which does not have a specific memory protection entry defined in either the static MPU register storage 36 or the memory protection table 22 in memory. Hence, in the event of a miss in the memory protection table 22, the memory access request could be checked against the default attributes and then whether or not the memory access request is permitted or rejected by the MPU 20 could be determined by the default attributes.

Figure 7:
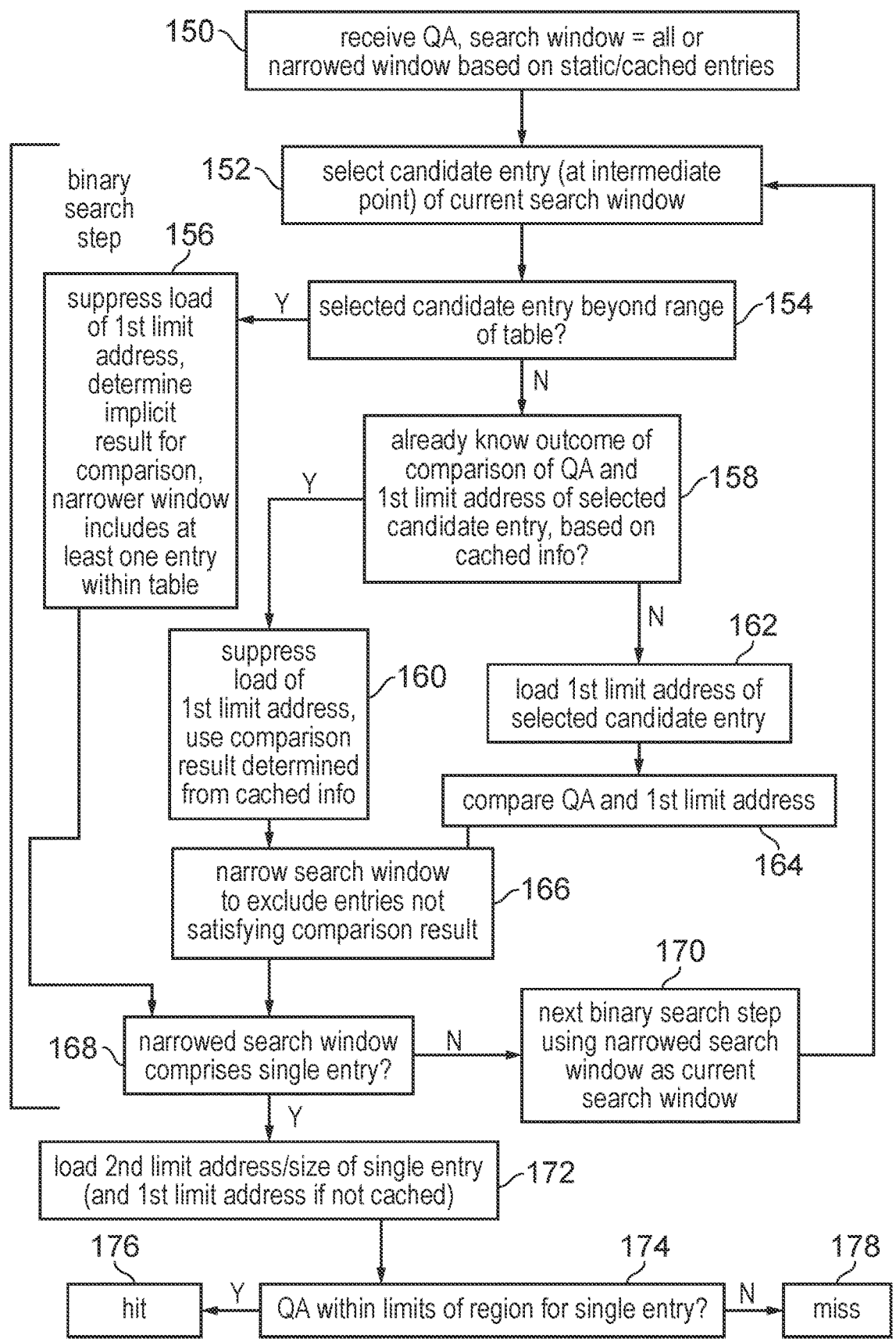
FIG. 7 is a flow diagram showing a method of looking up a control table based on a binary search procedure.

FIG. 7 is a flow diagram showing the lookup process at step 136 of FIG. 6 in more detail. FIG. 7 shows a method of looking up a control table which comprises a number of entries, where each entry specifies a first limit address and either a second limit address or a size of a corresponding address region of variable size. The size of the region may be permitted to be a number of bytes other than an exact power of 2. The limits of the corresponding address region may be unaligned to an N byte address boundary, where N is the size of the corresponding address region. In step 136 of FIG. 6, the control table is the memory protection table 22 and the query address used to lookup the table is the target address specified by the memory access request issued by the processing circuitry 4. However the lookup process of FIG. 7 could also be used for other forms of control table. For example they could be used in a control table which specifies secure or non secure address regions, or a control table for tracking which code belongs to particular software libraries being executed, which could be used by the processing circuitry to limit which sections of code are able to call other software libraries which can provide protection against return oriented programming attacks. Hence, it will be appreciated that the method shown in FIG. 7 could be applied to other forms of control table, not just the memory protection table 22.

At step 150 of FIG. 7 a query address is received by the lookup circuitry 26. The table lookup circuitry 26 determines an initial search window comprising a number of entries of the control table 22 to be searched to determine whether the query address corresponds to the corresponding address region of any of those entries. In some cases the search window may comprise all of the entries of a control table 22. Alternatively, in some implementations the table lookup circuitry 26 may determine, as the initial search window, a narrower search window which does not include all of the entries of the control table, with the particular narrowing of the search window being determined based on information derived from any cached entries stored in entries of the static MPU register storage unit 36 that are marked as unknown or the cached memory protection entries of the MPU cache storage 32. For example, if in the lookup of the MPU cache storage 32, it has already been determined that the query address is lower than the base address for a given cache entry 34, then it may be known that the matching entry of the memory protection table 22 can only have an entry identifier which is less than the entry ID 74 specified in that cache entry 34, since the entries of the control table 22 are ordered by the base address.

At step 152 the table lookup circuitry 26 starts the first binary search step of the binary search procedure performed to lookup the table. The binary search step (also known as search window narrowing step) comprises a number of steps 152-170 as shown in FIG. 7 which can be repeated multiple times in successive binary search steps. At step 152 a candidate entry of the control table 22 is selected, for example at an intermediate point of the current search window. Although not essential, for performance it can be preferable to locate the intermediate point as close as the mid point of the current search window as possible, although for even numbers of entries in the search window it may not be possible to have the candidate entry exactly halfway between the start and end of the search window. For example, if the search window includes 16 entries then either entry 8 or entry 9 of the 16 entries could be selected as the candidate entry. Also, for search windows comprising only 2 entries then one of the entries at the outer bound of the search window would be selected as the candidate entry.

At step 154 it is determined whether the selected candidate entry is beyond the valid range of the table. As sometimes the control table 22 may comprise a number of entries which does not correspond exactly to a power of 2, at step 150 for tables not having a power of 2 number of entries the search window may be framed as if the number of entries was equal to the next highest power of 2 and so sometimes at step 152 the selected candidate entry could actually be outside the valid range of the table. If so, then at step 156 the table lookup circuitry 26 suppresses the MPU memory access circuitry 24 from issuing any load operation for loading the first limit address of the selected candidate entry. Here the first limit address could be either the start address or the end address of the corresponding address region, depending on which of these is compared in each binary search step in a given implementation. For the MPU example discussed above it may be simplest for the first limit address to be the start address of the corresponding address region. At step 156, the table lookup circuitry determines that, as the selected candidate entry is beyond the range of the table, the results of a comparison of the query address and the first limit address may implicitly be determined such that when the search window is narrowed based on that comparison the narrower window includes at least one entry within the table. For example, if the comparison performed at step 164 is to determine whether the query address is less than the base address of a corresponding address region, then the implicit result for the comparison could be that the query address is less than the base address in cases where the selected candidate entry is beyond the range of the table, since this will tend to mean that the narrower window will exclude a portion of the table outside the valid range and will include at least one entry in the table.

If the selected candidate entry at step 154 is determined to be within the valid range of the table, then the method proceeds to step 158 where the table lookup circuitry 26 may determine whether the outcome of the comparison of the query address and the first limit address of the selected candidate entry is already known based on cached information in the MPU cache storage 22 or static MPU storage 36 (if a static entry marked as RDU is reversed as a cache). For example, if the query address has already been determined to be less than the base address of a given cache entry, then it may be implicit that when the selected candidate entry has an entry ID higher than the entry ID 74 of the given cached entry, the query address must also be less than the first limit address of the selected candidate entry. Alternatively, in systems where the first limit address is the upper end address of the corresponding address region, then if the lookup to the cache 32 has already determined that the query address was higher than the limit address of a given cache entry 34, then when the selected candidate entry has an entry ID equal to or less than the entry ID 74 of the given cache entry 34 then it may be implicit that the query address must be above the first limit address (end address) of the selected candidate entry. Hence, if the outcome of the comparison which would normally be performed between the query address and the first limit address for the selected candidate entry can already be known depending on the cached information then at step 160 a load MPU memory access request for loading the first limit address of the selected candidate entry is suppressed by the table lookup circuitry 26 and instead the comparison result determined from the cached information can be used instead of actually performing a comparison of the query address against a first limit address loaded from the memory system 10. Note that step 158 is optional and so some implementations may not use cached information to guide the lookup process. Also in systems where at step 150 the search window is narrowed based on the cached entries stored within the MPU 20, then the narrowed window at that stage may already exclude entries known from the cache storage not to be required, and so in this case step 158 may not be necessary as this may already have effectively been taken into account at step 150. Hence it will be appreciated that the cached information could be considered at one of two steps, either when formulating the initial search window, and/or when checking for a comparison result of a given binary search step, but it is not essential to do either. Both are shown in FIG. 7 for completeness.

If the outcome of a comparison between the query address and the first limit address for the selected candidate entry cannot be determined based on already cached information then at step 162 the table lookup circuitry 26 triggers the MPU memory access circuitry 24 to trigger a load MPU memory access request for loading the first limit address of the selected candidate entry from the memory system. Hence a load request may be issued specifying as its target address the address which corresponds to the sum of the base address 30 of the active MPU table and an offset determined based on the entry identifier of the selected candidate entry. This load operation may be subject to permission checking based on a default set of attributes and/or the memory security configurations specified by the SAU 42. When the first limit address (start or end address of the corresponding address region) is returned for the selected candidate entry then at step 164 the query address is compared against the returned first limit address. Regardless of whether the comparison was actually performed at step 164 or whether the comparison result was implicitly determined at step 160 based on cached information, at step 166 the search window is narrowed to exclude entries which do not satisfy the comparison result. For example, in the case where the first limit address is the start (base) address of the corresponding address region, the comparison at step 164 may determine whether the query address is less than the first limit address. If the query address is less than the first limit address then at step 166 the narrower search window may be determined to include the portion of the previous search window which comprises entries with entry identifiers less than the entry identifier of the selected candidate entry. Optionally the selected candidate entry itself could also be included in the narrower search window, which can sometimes make circuit implementation faster by reducing the length of the critical timing path as it avoids the need for additional subtraction operation to subtract one from the entry identifier of the selected candidate entry in order to identify the top of the narrower search window. If the query address is greater than the start address of the selected candidate entry, the narrower search window may exclude entries with an entry identifier smaller than the entry identifier of the selected candidate entry.

On the other hand, if the first limit address is the end address of the corresponding address region and at step 164 the comparison is to determine whether the query address is greater than the first limit address, then if the query address is greater than the first limit address then at step 166 the narrower search window may comprise those entries with entry identifiers greater than the entry identifier of the selected candidate entry. On the other hand when the query address is less than the upper address of the corresponding address region then the search window may be narrow to include the selected candidate entry and any remaining entries with entry identifiers less than the entry identifier of the selected candidate entry.

At step 168 the table lookup circuitry determines whether following the narrowing performed either at step 156 or at step 166 the narrower search window now comprises only a single candidate entry of the control table. If not then a further binary search step is still required and at step 170 the method proceeds to the next binary search step which uses the narrowed search window resulting from step 166 or step 158 as the current search window. The method then moves back to step 152 to repeat steps 152 to 168 for another binary search step.

If at step 168 it is determined that the narrower search window does comprise a single entry, then no further binary search steps are required. In this case at step 172 the second limit address or size specified by the single entry remaining in the narrower search window is loaded from the memory system. Again the load MPU memory access request issued to fetch the second limit address or size of the single entry from memory may be subject to checking by the SAU 42 and/or checking based on default memory access attributes. In some cases the MPU memory access circuitry 24 may also need to trigger a load to obtain the first limit address of the single candidate entry from the memory system, even if that first limit address was already checked at an earlier binary search step. Other implementations may provide caching of the first limit addresses for one or more selected candidate entries read in earlier binary search steps and so if the first limit address of the single entry remaining at step 172 is still cached then the load to obtain the first limit address of the single entry can be suppressed.

At step 174 the lookup circuitry 26 determines whether the query address is within the limits defined for the corresponding address region for the single remaining candidate entry. Hence, if the second limit is specified through an address then the lookup circuitry determines whether the query address lies between the first and second limit addresses (whether or not the first and second limit addresses are considered part of the corresponding address region or whether one of these addresses may be considered outside the corresponding address region may be an implementation-independent choice). On the other hand, if a size is used to define the second limit then the lookup circuitry may add or subtract the size to or from the first limit address to determine the second limit address and then again determine whether the query address lies between the first and second limits. If the query address is within the limits defined for the region corresponding to the single remaining entry, then at step 176 a hit is detected in the memory protection table. The attributes specified in the single remaining entry can then be returned and used to control a given operation performed by a processing component. For example for the MPU example shown above the operation performed using the hit entry may be the checking of the access permissions at step 132 of FIG. 6, but for other types of control table a different operation may be performed using the return attributes. On the other hand, if the query address is not within the limits of the corresponding address region for the single remaining entry, then at step 178 a miss is detected as there is no matching entry which corresponds to an address region including the query address.

Hence, with the binary search procedure defined in FIG. 7, the parameter defining the second limit address or the size only has to be loaded from memory for the single entry which remains after step 168. For each binary search step only the first limit address has to be loaded from memory at step 162 (and sometimes this load can be suppressed anyway if cached information can already be used to determine what the outcome of comparing the query address against the first limit address of the selected candidate entry would be). This approach helps to reduce the number of accesses to memory required to lookup the control table, enabling faster performance as the maximum memory overhead may scale with the number of entries N according to $\log 2(N)+1$ instead of $\log 2(N)*2$.

Figure 8:
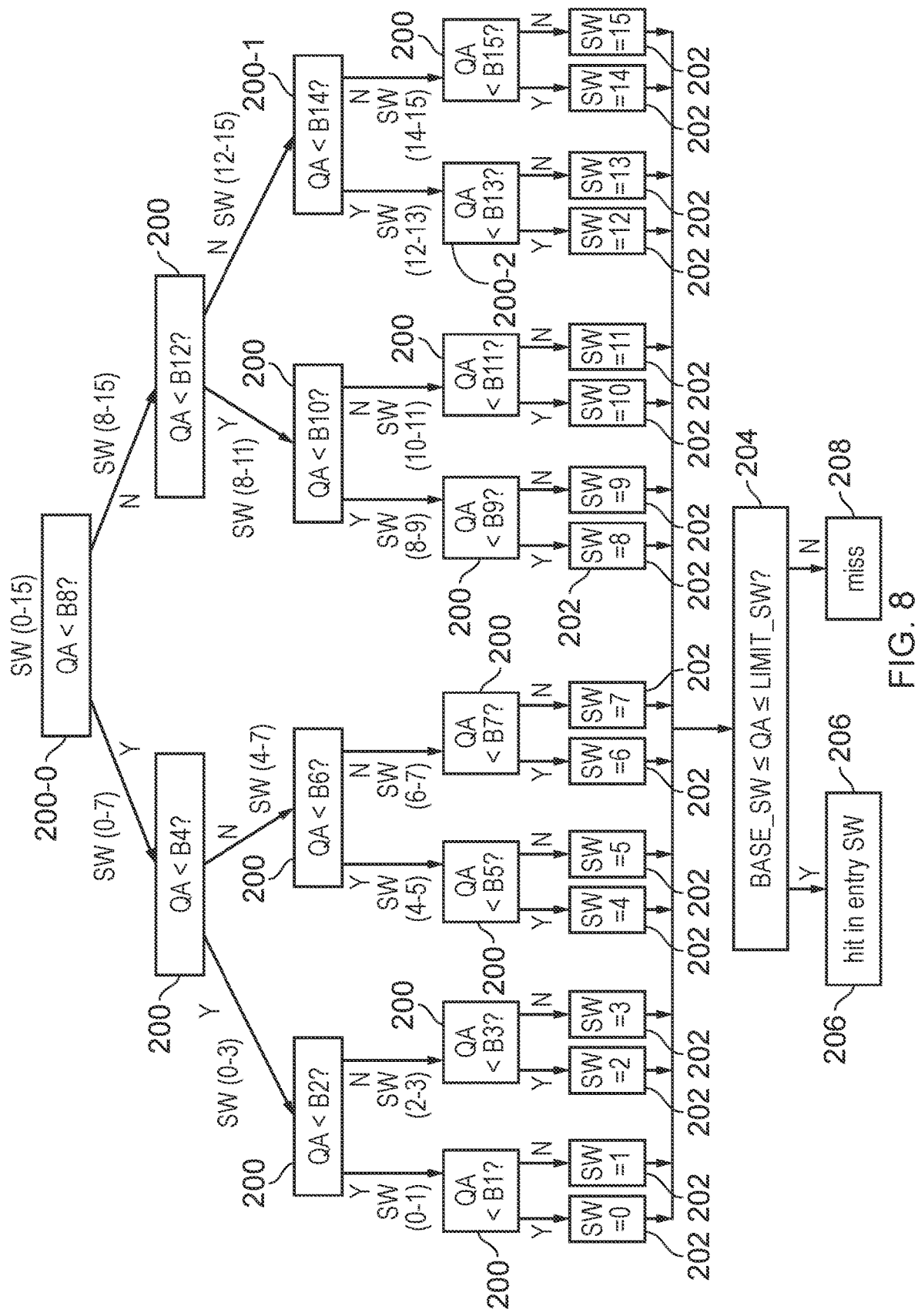
FIG. 8 shows a specific example of the binary search procedure for a table comprising up to 16 entries.

FIG. 8 shows a specific example of the binary search procedure for an example where the table has 16 entries. Each step marked 200 represents a particular binary search step 152-170 of FIG. 7, and is labelled with the particular comparison that would be performed at step 164 of the corresponding binary search step. In this example, the first limit address is the base address of the corresponding address region and so at each binary search step a less than comparison is made between the query address and the base address of the selected candidate entry at that step. The notation B6 refers to the base address of candidate entry 6 for example. Hence, in the first binary search step 200-0 the initial search window (SW) may include all 16 entries 0-15 and the selected candidate entry is entry 8 for example. Based on the less than comparison between the query address and the base address B8 of selected candidate entry 8, the search window is then narrowed to entries 0-7 if the query address is less than the base address of entry 8, or to entries 8-15 if the query address is equal to or greater than the base address for entry 8. Similarly, subsequent binary search steps again make a binary splitting of the candidate entries so as to narrow the search window by half at each binary search step, and so in a maximum of four binary search steps the search window of 16 entries can be reduced to a single entry as identified at the steps 202 marked in FIG. 8. The comparisons at some of the binary search steps 200 may have their result determined implicitly, rather than actually by loading the first limit address and comparing it against the query address, if this can be known based on cached information or if the actual number of entries in a table is not a power of 2 and so some of the upper entries may not actually have valid entries provided. For example, if the table only comprised 13 entries then the binary search step marked 200-1 for comparing the query address against the base address of entry 14 may implicitly provide a yes result so as to then proceed straight to the binary search step which acts on a narrower search window comprising entries 12 and 13. Similarly for N=13 (i.e. there are 13 entries 0 to 12), as there is no entry 13 because the top entry is entry 12 then the binary search step marked 200-2 may also produce an implicit yes result to identify that the single entry remaining in the search window should be entry 12.

Hence, having identified a single remaining candidate entry in one of steps 202, this means that either the query address hits against the single remaining entry or the query addresses missed altogether. To determine which of these is true, the lookup circuitry at step 204 (i.e. step 174 of FIG. 7) determines whether the query address is between the base and limit address for the region defined by the single remaining entry. It will be appreciated that one or other of the base and the limit could be determined through a size parameter which is applied to the other limit of the region. Hence if the query address is between the base address and the end address for the corresponding entry then at step 206 a hit is detected in that particular entry and if the query address is not between these limits then a miss is detected at step 208.

Figure 9:
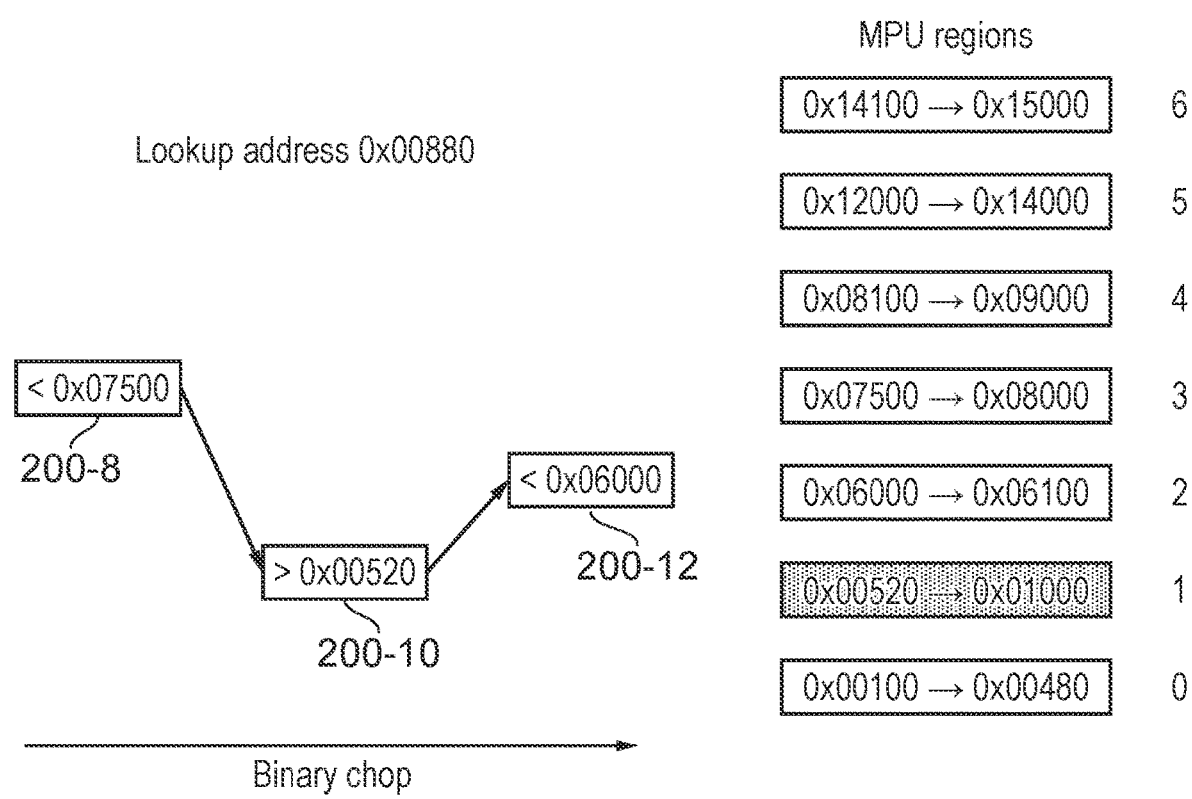
FIG. 9 shows a worked example of the binary search procedure.

FIG. 9 shows a specific example of looking up a particular query address in the table. In this example the initial search window is determined to comprise seven entries (entries 0-6), either because of use of existing cached information or static MPU register information, or because the table only comprises seven entries in the first place. An entry 3 is selected at an intermediate point of the search window in a first binary search step 200-8 and this determines that the query address 0x00880 is less than the start address 0x07500 of entry 3 and so the search window narrows to exclude entries 4-6 (and optionally also entry 3 could be excluded or included as desired dependent on the particular implementation used). In the second binary step 200-10 the selected candidate entry is entry 1 and this time the query address is determined to be greater than the start address for the region behind entry 1. Hence now the search window can exclude entry 0. Hence now it is known that the query address must either correspond to entry 1 or entry 2 or does not correspond to any of the entries in the table. Hence the binary search continues and now entry 2 becomes the selected candidate entry at step 200-12 and the base address of region 2 is loaded. This time the comparison of the query address against the base address of region 2 indicates that the query address is less than the base address of region 2. Hence it is determined that region 1 is the correct region to load and this entry is returned and the limit address defining the end address for that region is loaded from memory. The need to reload the base address of region 1 can be avoided if the processor has cached the value of the base address of region 1 at the previous binary search step. In this particular case the query address then turns out to be between the start and end addresses of region 1 and so a hit is detected in the memory detection table. However, if the query address had not been between the limits of the final entry identified in the final binary search step then a miss would be detected.

Figure 10:
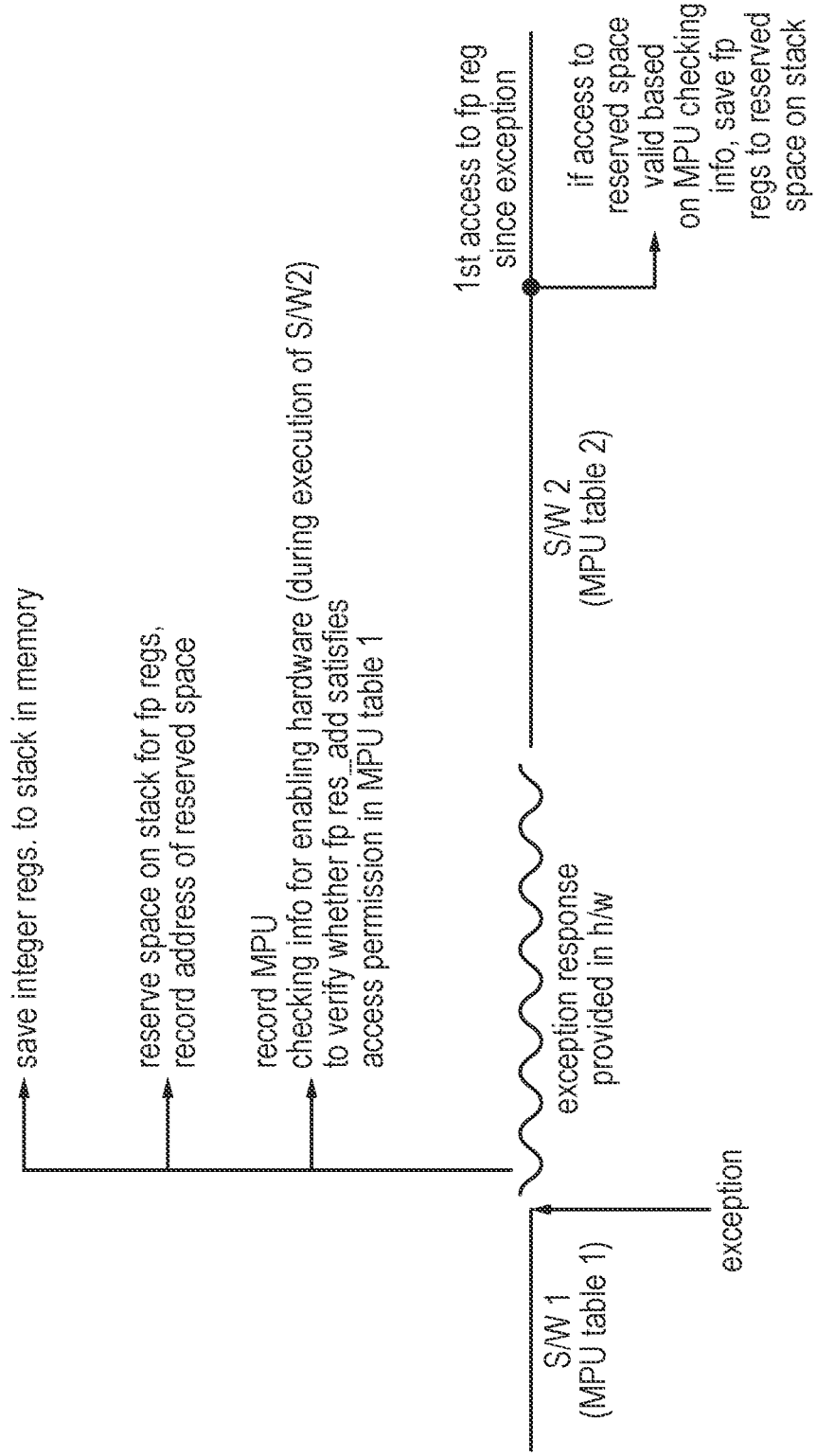
FIG. 10 shows an example of lazy state saving.

FIG. 10 shows an example of lazy state saving which may be used for handling exceptions within the processing system 2 shown in FIG. 1. As shown in FIG. 1, the processing circuitry may include general purpose registers 12 and floating point registers 14. On encountering an exception, it may be necessary to save contents of the registers 12 to a stack data structure provided in memory 10, so that the architectural state of the software which was executed before the exception can be preserved so that software executing after the exception (such as an exception handler or process to which a context switch has been made) can overwrite the data in, and then reuse the registers 12. However, while the floating point architectural state in the registers 14 may also need to be preserved, in practice not all software processes use the floating point registers. In processes which do not include any floating point instructions then the floating point registers may not be needed. The saving of state from registers 12, 14 to the stack data structure in the memory system 10 takes some time. Hence, if either the first software process executing before the exception or the second software process executing after the exception does not need the floating point registers, the time spent saving floating point states from memory may effectively be wasted.

Hence, as shown in FIG. 10 a lazy state saving approach can be used where in response to the exception the integer registers 12 are saved to the stack in memory, but the floating point state in registers 14 is not saved in response to the exception. Instead, saving of floating point registers may be triggered only if the second software subsequently executes a floating point instruction to trigger an access to the floating point registers 14, in cases where it has already been determined that the first software has used the floating point registers. While the floating point registers are not actually saved in response to the exception, nevertheless in response to the exception some space is reserved on the stack in memory 10 for the floating point registers and an address of the reserved region on the stack is recorded. This ensures that the layout of the stack frame used to preserve the state saved for the first software process executed before the exception can be consistent regardless of whether the floating point registers have actually been saved yet or not, which can make subsequent state restoration simpler.

However, when an address is reserved for saving the floating point registers, this may be an address in the stack data structure accessible to the first software process which was executing before the exception happened. By the time that the floating registers are actually saved to the reserved space in the stack the permission checking circuitry 40 of the MPU 20 may need to check whether the memory access to save the floating point state to the reserve space in the stack is permitted, however as the active table identifier register 28 may have been reconfigured for use by the second software process, the MPU 20 may no longer have access to the MPU table which was used by the first software which defines whether the first software is allowed to save state to that region on the stack.

Figure 11A:
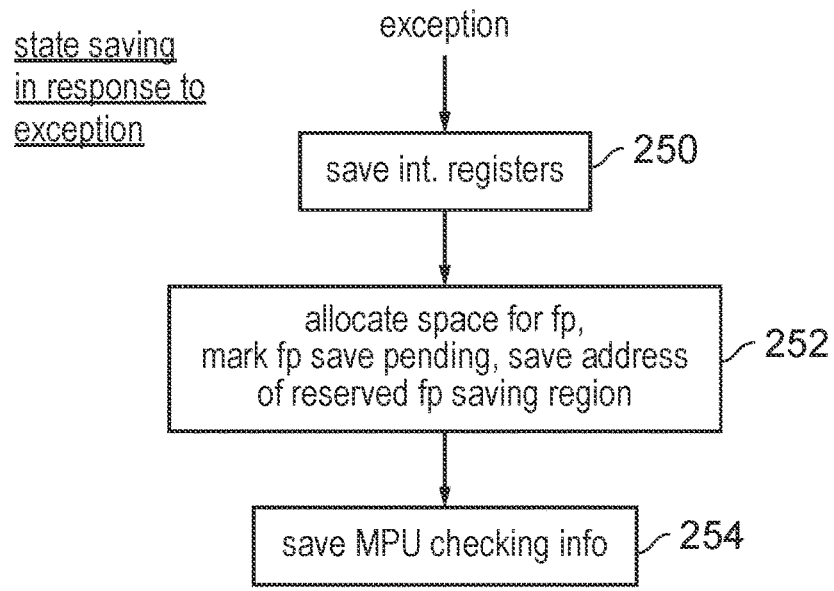
FIGS. 11A to 12B show flow diagrams illustrating examples of control of lazy state saving.
Figure 11B:
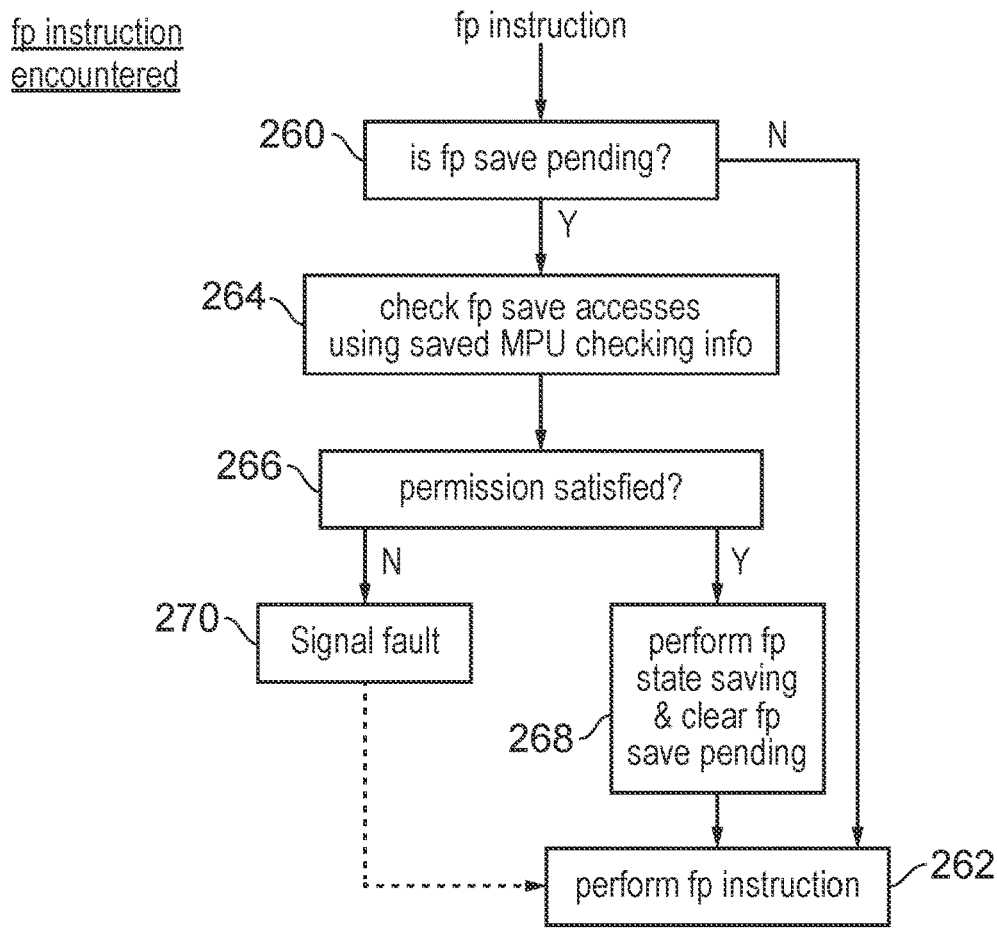
Figure 12A:
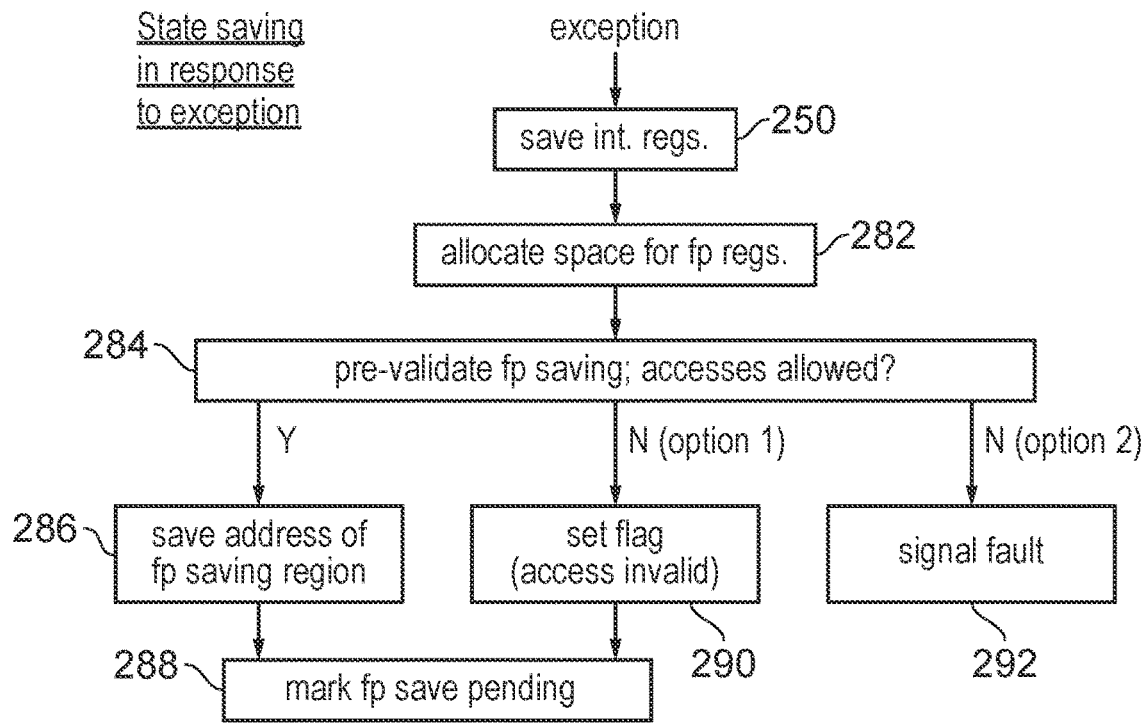
Figure 12B:
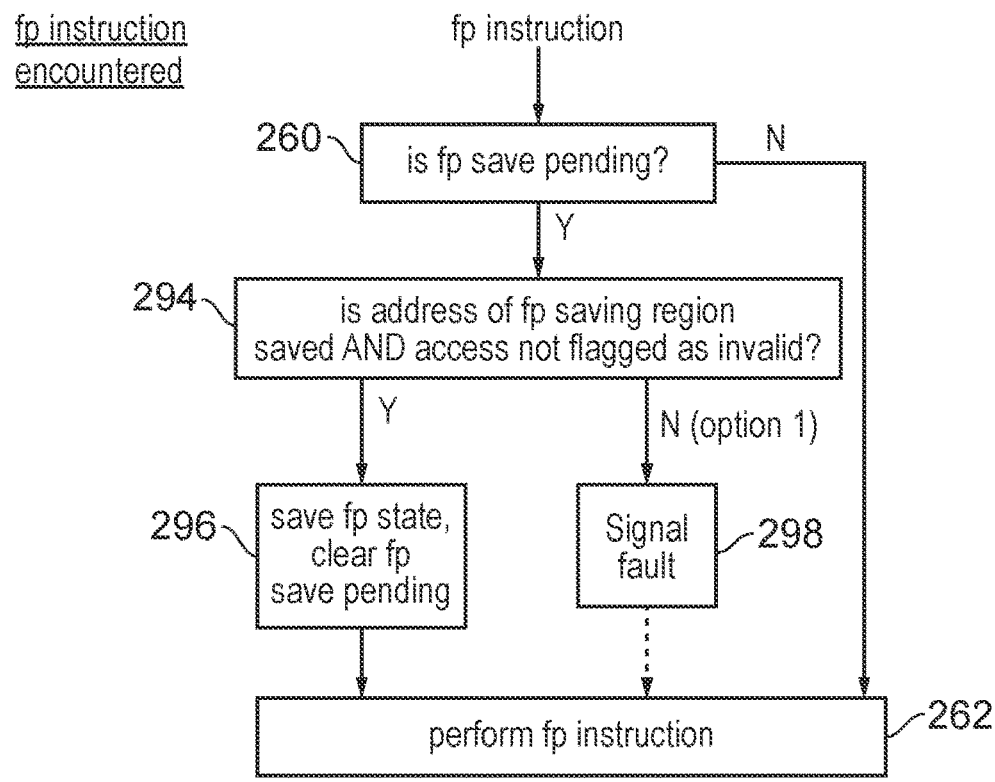

To address this issue, at the time of the exception, in addition to recording the address of the space reserved on the stack for the floating point registers, the exception handling logic associated with the processing circuitry 4 may also record MPU checking information for enabling hardware during execution of the second software process to verify whether the address of the reserved space on the stack satisfies access permissions defined in a corresponding entry of the MPU table 22 which was used during execution of the first software. This recorded MPU checking information can take different forms. In some cases the recorded MPU checking information could comprise the active table identifier which was present in register 28 at the time of the exception occurring, so that the MPU can then later when the floating point registers are saved. check whether the address satisfies access permission specified in that particular memory protection table, even if the active table has changed as a result of the exception. Alternatively the MPU could pre-validate the region reserved for storage of the floating point state at the time of the exception itself, and record information indicating whether that validation was successful. FIGS. 11A and 11B show an example which uses the first option, while FIGS. 12A and 12B show an example which uses the second of these options.

It will be appreciated that the lazy state shown in FIG. 10 is just one option for handling exceptions. In some systems control data within a control register may specify whether lazy state saving is actually to be used for handling exceptions, so the lazy state saving approach may not always be applied to every exception and some exceptions could still be handled by saving both the integer and floating point state at the time of the exception. Hence the technique shown in FIGS. 11a to 12b may be used in cases where lazy state saving is enabled by the control data.

FIGS. 11A and 11B show an example of lazy state saving in cases where the validation of the address of the reserved space on the stack for the floating point state is performed at the time of encountering a floating point instruction to be executed after the exception. FIG. 11A shows the actions triggered in response to the exception itself and FIG. 11B shows the actions triggered by the subsequent floating point instruction.

As shown in FIG. 11A, at step 250, in response to the exception the exception handling hardware triggers saving of the integer registers to the stack data structure. At step 252 space is allocated on the stack for saving floating point state (e.g. the stack pointer data is updated so that any subsequently saved data will be saved to a location of the stack beyond the allocated space for the floating point state, even if the floating point state has not itself yet been saved). Alternatively some embodiments may perform the steps 252 and 250 in reverse, so that the integer registers are saved to the stack beyond the space allocated for the floating point state. A lazy floating point saving operation is marked as pending by setting a flag in a control register. Also the address identifying the floating point saving region is saved to memory or to a control register. At step 254 the exception handling hardware triggers saving of MPU checking information for enabling the hardware to later check whether the address of the reserved floating point saving region could validly be accessed by the process executing before the exception, again either to a structure in memory or to a register. The MPU checking information in this example may for example be the active table ID which was provided in register 28 at the time the exception occurred, or could be some other identifier which enables the location of the required entry in the MPU table associated with the process executing before the exception to be determined. It will be appreciated that FIG. 11A does not show all of the operations which may occur in response to an exception, but merely shows the operations relevant to the lazy state saving. In some cases, the MPU entry associated with the stack could be locked in the cache to prevent eviction.

As shown in FIG. 11B, having handled the exception and commenced execution of the second software process after the exception, a floating point instruction is then encountered. At step 260 it is determined whether the flag stored in the control register indicates whether the floating point saving operation is still pending. If the floating point saving operation is no longer pending then at step 262 the floating point instruction is executed. However if a floating point saving operation is still pending then at step 264 the address of the reserved floating point saving region is obtained and checked by the MPU using the saved MPU checking information. It may be needed to detect whether the entire address region reserved for saving a floating point saving can be validated based on the MPU table identified through the MPU checking information. If both the start and end address of the region reserved for saving the floating point state correspond to the same memory protection entry of the MPU table then this can simplify the checking since a single check of the access permissions for one address within that region can be enough to determine whether all of the accesses for saving the floating point state to the stack are allowed. Hence, in some cases the MPU checking information stored at step 254 of FIG. 11A may also include an indication of whether the start and end addresses of the reserved region correspond to the same memory protection entry.

Hence, at step 264 the MPU 20 obtains one or more memory protection entries corresponding to the reserved region, and at step 266 checks whether the access permissions specified by those entries are satisfied by memory access requests issued for saving the floating point state. If the access permissions are satisfied then at step 268 the floating point state is saved to the stack structure in the memory and the floating point save pending indication is cleared to indicate that on a subsequent floating point instruction there is no need to perform the state saving again. However if the permissions are not satisfied for any access requests for saving the floating point state then at step 270 a fault is signalled. In some cases the fault may prevent the floating point instruction being executed. However on other occasions the floating point instruction may nevertheless be executed despite the fault, since if the fault has a lower priority then an exception already being handled then the fault may remain pending until that earlier exception has finished being processed, and then may be handled later. The dotted line between steps 270 and 262 of FIG. 11B indicates that sometimes, despite the fault, the floating point instruction may still be performed.

FIGS. 12A and 12B illustrate an alternative to FIGS. 11A and 11B, with FIG. 12A showing the state saving in response to an exception and FIG. 12B showing the operations performed for state saving in response to a floating point instruction being encountered. In this example, in response to the exception, step 250 is the same as in FIG. 11A. At step 282 space is allocated in the stack structure for saving the floating point registers. Again some implementations may reverse these steps and allocate the space for the floating point registers on the stack before allocating space for and saving the integer registers. In this example the address of the allocated region on the stack is pre-validated at the time of the exception handling at step 284 of FIG. 12A. That is, the addresses of locations within the allocated space in the stack are validated against the active memory protection table identified by the active table ID register 28. Based on the access permissions specified in any matching MPU entries it is determined whether the accesses for saving the floating point state would be allowed, and if so at step 286 the address of the floating point saving region is stored to memory or to a register. In some cases the fact that the address of the floating point saving region itself has been stored may be enough to indicate that the pre-validation at step 284 was successful, so it may not be necessary to also store a flag indicating that the pre-validation was successful. Alternatively a separate flag may also be provided to confirm that the validation was successful. Having saved the address of the region allocated for saving a floating point state at step 286, at step 288 the floating point save pending indication is set to indicate that a floating point saving operation would be required on the first floating point instruction executed after the exception. Hence, in this example the MPU checking information may be the indication that the pre-validation at step 284 was successful.

If the pre-validation at step 284 determines that the accesses for saving point state are not allowed, then there may be 2 options. In a first option, at step 290 the exception handling circuitry or the MPU may set a control flag which specifies that the accesses for storing the floating point state would be invalid, but nevertheless no fault is triggered and then at step 288 the floating point saving operation is marked as pending. It may be preferred to allow the subsequent processing to proceed without a fault even though the pre-validation was unsuccessful, as this means that if the code executing after the exception never accesses a floating point register then performance is improved because no fault was triggered unnecessarily as the invalid accesses to the saved region for storing the floating point state were never performed. Alternatively in a second option at step 292, in the case when the accesses are determined not to be allowed in the pre-validation, a fault may be triggered.

FIG. 12B shows the corresponding operations performed in response to encountering a floating point instruction after handling an exception. At step 260 it is determined whether the floating point state saving operation is pending, and as in FIG. 11B if there is no floating point saving operation pending then at step 262 the floating point instruction is executed as before. If the floating point saving operation is pending then it is determined at step 294 whether the address of the floating point saving region has been saved and whether the access has been flagged as invalid in the pre-validation. In some cases, the fact that the address has itself been stored may be taken as an indication that the access has not been flagged as invalid, or alternatively if a specific control flag specifies whether the pre-validation at step 284 was successful then this may be used to determine whether to proceed with the floating point saving. If the address of the floating point saving region has been saved and the access is not invalid, then at step 296 the floating point state is saved to the region previously reserved on the stack, as identified by the address of the floating point state saving region. Also, the floating point saving operation is cleared as being pending, so that any subsequent floating point instruction will not trigger the floating point saving operation. On the other hand, if the access was flagged as invalid or the address of the floating point saving region has not been saved, then at step 298 a fault is triggered. Note that this corresponds to option 1 in the example of FIG. 12A since if option 2 had been chosen then the processing would never have arrived at FIG. 12B.

Hence, in general by saving some information for enabling either the relevant MPU entry associated with the process executing before the exception to be located, or to confirm that pre-validation performed at the time of responding to the exception was successful, this enables lazy state saving triggered by a hardware while executing a process after the exception to be safely validated even if the active memory protection changed in response to the exception.

Figure 13:
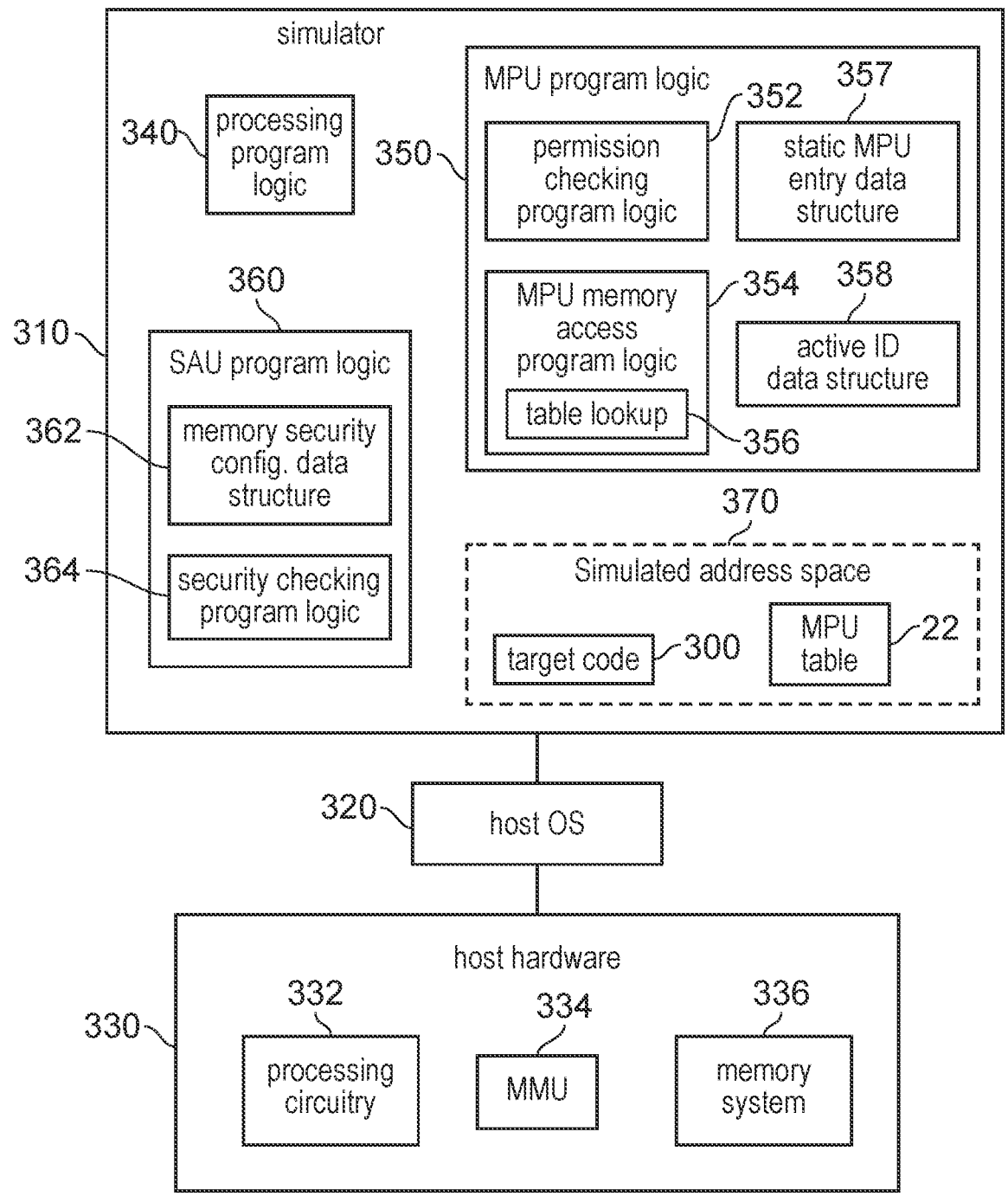
FIG. 13 shows a simulator example that can be used.

FIG. 13 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. The host processor 330 includes host processing circuitry 332, a memory management unit (MMU) 334 supporting address translation and memory access permission checking based on hierarchical page tables stored in memory, and a memory system 336. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 (which may include applications, operating systems and a hypervisor) which is the same as the application program interface of the hardware architecture being modelled by the simulator program 310. Thus, the program instructions of the target code 300, may be executed from within the instruction execution environment using the simulator program 310, so that a host computer 330 which does not actually have the hardware features of the apparatus 2 discussed above can emulate these features.

As shown in FIG. 13, the simulator program 310 may include processing program logic 340, MPU program logic 350 and SAU program logic 360 corresponding in functionality to the processing circuitry 4, MPU 20 and SAU 42 of FIG. 1. The MPU program logic 350 includes permission checking program logic 352, MPU memory access program logic 354, and table lookup program logic 356 corresponding in functionality to the permission checking circuitry 40, MPU memory access circuitry 24, and table lookup circuitry 26 respectively. The MPU program logic 350 also includes program logic for managing a static MPU entry storage structure 357 and active ID data structure 358 corresponding to the static MPU register storage 36 and active table ID register 28 respectively. The actual data of the data structures 357, 358 is stored in the memory system 336 of the host hardware 330, but the simulator program includes logic for defining the data structures 357, 358 and accessing data on the data structures 357, 358. There is no need to provide program logic corresponding to the MPU cache storage 32 of FIG. 1, as in the simulation all the underlying data is stored in the memory system 336 of the host hardware 330 and so simulating a cache is unlikely to provide any performance improvement. Nevertheless, the static MPU entry data structure 357 is simulated separate from the MPU table 22, so that the simulator remains compatible with code designed to interact with the statically defined MPU entries. In some implementations the simulator 310 may also include program logic to simulate the MPU cache storage 32, as although this may not benefit the performance of the simulation, it may be desired if the simulator aims to accurately simulate the number of clock cycles the simulated MPU 350 would take to respond to a memory access request. The SAU program logic 360 includes a memory security configuration data structure 362 and security checking program logic 364 corresponding in functionality to the memory security configuration registers 44 and security checking circuitry 46 of FIG. 1.

The simulator program 310 manages simulation of a simulated address space 370 which corresponds to the physical address space which would be provided on the processor being simulated by the simulator program 310. The target code 300 to be executed, and the memory protection table 22 are associated with addresses within the simulated address space 370. The target code 300 includes memory access instructions specifying physical addresses within the simulated address space 370, which are subject to permission checks by the MPU program logic 350 based on the access permissions defined in the static MPU entry data structure 357 and/or MPU table 22, and if they pass the permission checks, are mapped under control of the simulator program 310 to virtual addresses of the host platform, which may then be translated by the MMU 334 of the host hardware to physical addresses used to access the host memory system 336 (the MMU 334 may apply further permission checks to check whether the memory accesses to the memory system are permitted, based on page tables defined by the host operating system 320).

Hence, the simulator 310 enables a host platform not having hardware support for an MPU with a memory-based memory protection table to execute code designed for a platform with such hardware support.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
processing circuitry to issue memory access requests specifying a target address identifying a location to be accessed in a memory system; and
a memory protection unit (MPU) comprising:
permission checking circuitry to check whether a memory access request issued by the processing circuitry satisfies access permissions specified in a memory protection table stored in the memory system, the memory protection table comprising a plurality of memory protection entries, each memory protection entry specifying: access permissions for a corresponding address region of variable size within an address space, and region identifying parameters for identifying a start address and an end address of the corresponding address region, each memory protection entry specifying separate region identifying parameters for identifying the start address and the end address, wherein the region identifying parameters are specified separately for each address region having a corresponding memory protection entry, wherein said MPU is configured to permit said variable size to be a number of bytes other than a power of 2; and
MPU memory access circuitry to initiate at least one MPU memory access request for accessing the memory protection table from said memory system, wherein the MPU memory access circuitry is configured to determine whether a memory access request specifying a given target address hits against a given memory protection entry using the separate region identifying parameters identifying the start address and end address of the corresponding address region specified by the given memory protection entry.

2. The apparatus according to claim 1, wherein said plurality of memory protection entries in said memory protection table are arranged in said address space in order of the start address of the corresponding address region for the plurality of memory protection entries.

3. The apparatus according to claim 1, in which for each memory protection entry, the MPU is configured to permit the start address and the end address of the corresponding address region to be unaligned to an N byte address boundary, where N bytes is the size of the corresponding address region.

4. The apparatus according to claim 1 in which said MPU comprises static MPU register storage to store at least one static memory protection entry which, once configured by at least one MPU parameter configuration operation processed by the processing circuitry, remains stored in said static MPU register storage until a further MPU parameter configuration operation is processed by the processing circuitry to trigger a reconfiguration of said at least one static memory protection entry.

5. The apparatus according to claim 4, in which in response to the memory access request issued by the processing circuitry, the MPU memory access circuitry is configured to suppress said at least one MPU memory access request from being issued to the memory system when the target address is within the corresponding address region for one of said at least one static memory protection entry stored in said static MPU register storage and the memory access request issued by the processing circuitry satisfies the access permissions specified by said one of said at least one static memory protection entry.

6. The apparatus according to claim 5, in which the MPU memory access circuitry is also configured to suppress said at least one MPU memory access request from being issued to the memory system when the memory access request issued by the processing circuitry fails to satisfy the access permissions specified by said one of said at least one static memory protection entry.

7. The apparatus according to claim 5, in which when the memory access request issued by the processing circuitry fails to satisfy the access permissions specified by said one of said at least one static memory protection entry, the MPU is configured to permit the access permissions specified by said one of said at least one static memory protection entry to be overridden by access permissions specified by a matching memory protection entry within the memory protection table stored in the memory system, said matching memory protection entry comprising an entry for which the corresponding address region includes the target address.

8. The apparatus according to claim 4, in which each static memory protection entry is associated with an unused indication indicative of whether the static memory protection entry is an unused static memory protection entry.

9. The apparatus according to claim 8, in which when a given static memory protection entry is indicated as an unused static memory protection entry, the MPU is configured to cache a memory protection entry from the memory protection table in a portion of the static MPU register storage corresponding to said given static memory protection entry.

10. The apparatus according to claim 1, in which the MPU comprises MPU cache storage to cache at least one memory protection entry of the memory protection table.

11. The apparatus according to claim 10, in which in response to the memory access request issued by the processing circuitry, the MPU memory access circuitry is configured to determine whether to initiate said at least one MPU memory access request depending on whether the target address is within the corresponding address region specified for any memory protection entry stored in the MPU cache storage.

12. The apparatus according to claim 10, in which the MPU cache storage is configured to specify, for each cached memory protection entry, an entry identifier associated with a position in the memory protection table from which the cached memory protection entry was obtained, said processing circuitry being responsive to an entry identifier query instruction to retrieve said entry identifier.

13. The apparatus according to claim 10, in which the MPU cache storage is configured to specify, for each cached memory protection entry, a table identifier associated with the memory protection table from which the cached memory protection entry was obtained;
the apparatus comprises an active table identifier register to store an active table identifier identifying an active memory protection table; and the MPU is configured to suppress usage of a cached memory protection entry stored in the MPU cache storage for which the table identifier is different to said active table identifier stored in the active table identifier register.

14. The apparatus according to claim 10, comprising an active table identifier register to store an active table identifier identifying an active memory protection table;

wherein said MPU is configured to invalidate all entries in said MPU cache storage in response to said active table identifier register being modified.

15. The apparatus according to claim 10, in which in response to a memory protection cache invalidation operation, the processing circuitry is configured to trigger the MPU to invalidate one or more cached memory protection entries stored in said MPU cache storage that meet an invalidation condition.

16. The apparatus according to claim 10, in which each memory protection entry in the memory protection table stored in the memory system specifies whether the memory protection entry is an enabled entry providing valid access permissions or a disabled entry providing invalid access permissions; and said MPU cache storage is prohibited from caching a disabled entry of the memory protection table stored in the memory system.

17. The apparatus according to claim 1, comprising:

a base address register to store a base address of an active memory protection table to be accessed by the MPU memory access circuitry in response to memory access requests issued by the processing circuitry; and a size register to store an indication of a size of said active memory protection table.

18. The apparatus according to claim 17, in which in response to a predetermined type of MPU configuration operation specifying that one of said base address and said size of the active memory protection table is to be updated, the processing circuitry is configured to update said one of said base address and said size, and also to update the other of said base address and said size to an invalid value indicating that there is no active memory protection table.

19. The apparatus according to claim 1, in which said permission checking circuitry is configured to determine whether said at least one MPU memory access request is permitted based on a default set of access permissions specified independently of the memory protection table.

20. The apparatus according to claim 1, in which said permission checking circuitry is configured to determine whether said at least one MPU memory access request is permitted based on whether the address of said least one MPU memory access request is within at least one of a plurality of address ranges specified by a plurality of memory security configuration registers.

21. An apparatus comprising:

processing circuitry to issue memory access requests specifying a target address identifying a location to be accessed in a memory system; and a memory protection unit (MPU) comprising:

permission checking circuitry to check whether a memory access request issued by the processing circuitry satisfies access permissions specified in a memory protection table stored in the memory system, the memory protection table comprising a plurality of memory protection entries, each memory protection entry specifying: access permissions for a corresponding address region of variable size within an address space, and region identifying parameters for identifying a start address and an end address of the corresponding address region, wherein said MPU is configured to permit said variable size to be a number of bytes other than a power of 2; and MPU memory access circuitry to initiate at least one MPU memory access request for accessing the memory protection table from said memory system, wherein:

in response to an exception condition, the processing circuitry is configured to perform state saving of a first portion of architectural state to the memory system, and to record an indication of a second portion state saving address region at which a second portion of architectural state is to be saved by said processing circuitry to the memory system in response to an access to the second portion of architectural state by a subsequent software process executing after the exception condition; and in response to the exception condition, the MPU is configured to record MPU checking information for enabling the MPU during execution of the subsequent software process to determine whether a memory access for saving the second portion of architectural state to the memory system would satisfy access permissions specified by a memory protection entry of the memory protection table that was active when said exception condition occurred.

22. The apparatus according to claim 21, in which said MPU checking information comprises a base address and a size of the memory protection table that was active when said exception condition occurred.

23. The apparatus according to claim 21, in which said MPU checking information comprises an indication of whether the start address and end address of said second portion state saving address region correspond to the same memory protection entry of the memory protection table that was active when said exception condition occurred.

24. A non-transitory, computer-readable storage medium storing a computer program for controlling a host data processing apparatus to provide an instruction execution environment for execution of instructions; the computer program comprising:

processing program logic to issue memory access requests specifying a target address identifying a location to be accessed within a simulated address space simulated by said instruction execution environment; and memory protection unit (MPU) program logic, comprising:

permission checking program logic to check whether a memory access request issued by the processing program logic satisfies access permissions specified in a memory protection table comprising a plurality of memory protection entries, each memory protection entry specifying: access permissions for a corresponding address region of variable size within said simulated address space, and region identifying parameters for identifying a start address and an end address of the corresponding address region, each memory protection entry specifying separate region identifying parameters for identifying the start address and the end address, wherein the region identifying parameters are specified separately for each address region having a corresponding memory protection entry, wherein said MPU program logic is configured to permit said variable size to be a number of bytes other than a power of 2; and MPU memory access program logic to initiate at least one MPU memory access request specifying an address from said simulated address space, for accessing the memory protection table;

wherein the MPU memory access program logic is configured to determine whether a memory access request specifying a given target address hits against a given memory protection entry using the separate region identifying parameters identifying the start address and the end address of the corresponding address region specified by the given memory protection entry.

* * * * *